(12) United States Patent
Kawanishi et al.

(10) Patent No.: US 7,099,082 B2
(45) Date of Patent: Aug. 29, 2006

(54) METHOD FOR PRODUCING OPTICAL COMPENSATING FILM, OPTICAL COMPENSATING FILM, CIRCULARLY POLARIZING PLATE, AND LIQUID CRYSTAL DISPLAY

(75) Inventors: Hiroyuki Kawanishi, Minami-Ashigara (JP); Hiroaki Sata, Minami-Ashigara (JP); Kiyokazu Hashimoto, Minami-Ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 161 days.

(21) Appl. No.: 10/486,089

(22) PCT Filed: Aug. 29, 2002

(86) PCT No.: PCT/JP02/08749

§ 371 (c)(1),
(2), (4) Date: Feb. 6, 2004

(87) PCT Pub. No.: WO03/018672

PCT Pub. Date: Mar. 6, 2003

(65) Prior Publication Data

US 2004/0241344 A1    Dec. 2, 2004

(30) Foreign Application Priority Data

Aug. 29, 2001 (JP) ............................. 2001-259724
Sep. 19, 2001 (JP) ............................. 2001-285104

(51) Int. Cl.
    *G02B 5/30* (2006.01)

(52) U.S. Cl. ..................... 359/499; 359/500; 264/1.34; 349/96

(58) Field of Classification Search ............... 359/499
    See application file for complete search history.

(56) References Cited

U.S. PATENT DOCUMENTS 2,353,023 A    7/1944  Deutsch et al.
2001/0026338 A1  10/2001  Aminaka

FOREIGN PATENT DOCUMENTS

| EP | 0 723 986 | 7/1996 |
| EP | 0 723 993 | 7/1996 |
| EP | 0 911 656 | 4/1999 |
| EP | 1 037 072 | 9/2000 |
| EP | 1 182 470 | 2/2002 |
| GB | 344 170 | 3/1931 |
| JP | 10 152568 | 6/1998 |
| WO | 00 65384 | 11/2000 |

OTHER PUBLICATIONS

K. Mantsumoto et al., "Stretchability of Cellulose Acetate Fims by Swell-Wet Process", Journal of the Society of Fiber Science and Technology, Japan, vol. 56, No. 1, 2000, pp. 6-11, XP001117803, p. 6, left-hand column, line 1, p. 11, right-hand column, line 14.

*Primary Examiner*—Mark A. Robinson
*Assistant Examiner*—Lee Fineman
(74) *Attorney, Agent, or Firm*—Buchanan Ingersoll & Rooney PC

(57) ABSTRACT

Provided is a method for producing an optical compensating film, which comprises stretching a cellulose acetate film, the cellulose acetate film having a water content of 2.0 to 20.0% by weight, wherein the cellulose acetate for the film has an acetyl value of from 57.0% to 62.5%.

23 Claims, 5 Drawing Sheets

METHOD FOR PRODUCING OPTICAL COMPENSATING FILM, OPTICAL COMPENSATING FILM, CIRCULARLY POLARIZING PLATE, AND LIQUID CRYSTAL DISPLAY

TECHNICAL FIELD

The present invention relates to a method for producing an optical compensating film (especially λ/4 plate) of cellulose acetate. Further, the invention relates to the optical compensating film produced in the method, and to an image display comprising it (e.g., reflection or semi-transmission liquid crystal display, organic electroluminescent (EL) device-having display).

BACKGROUND ART

A liquid crystal display generally comprises at least a liquid crystal cell, a polarizing plate and an optical compensating sheet (phase retarder plate). Concretely, a transmission liquid crystal display comprises two polarizing plates disposed on both sides of a liquid crystal cell therein, and one or two optical compensating sheets sandwiched between the liquid crystal cell and the polarizing plate. A reflection liquid crystal display comprises a reflector, a liquid crystal cell, one optical compensating sheet and one polarizing plate that are arrayed in that order.

The liquid crystal cell in such displays generally comprises rod liquid-crystalline molecules, two substrates for sealing up them, and an electrode layer for applying voltage to the rod liquid-crystalline molecules. Various display modes of liquid crystal cells are proposed, depending on the difference in orientation of the rod liquid-crystalline molecules in the cells. For example, TN (twisted nematic)-mode cells, IPS (in-plane switching)-mode cells, FLC (ferroelectric liquid crystal)-mode cells, OCB (optically compensatory bend)-mode cells, STN (super twisted nematic)-mode cells and VA (vertically aligned)-mode cells are for transmission displays; and HAN (hybrid aligned nematic)-mode cells are for reflection displays.

The polarizing plate generally comprises a polarizing film and a transparent protective film, and the polarizing film is generally prepared by dipping a polyvinyl alcohol film in an aqueous solution of iodine or dichromatic dye followed by monoaxially stretching the thus-dipped film. Two transparent protective film are attached to both sides of the polarizing film to construct the polarizing plate.

Optical compensating sheets are used in various liquid crystal displays for solving a problem of image discoloration and for enlarging the field of view.

Of those, λ/4 plates have many applications, for example, for optical compensating films for liquid crystal displays, and antireflection films for organic EL displays, and they are now in practical use. However, many λ/4 plates heretofore used in the art attain λ/4 or λ/2 only in a specific wavelength range.

JP-A 27118/1993 and 27119/1993 disclose an optical compensating film fabricated by laminating a birefringent film of large retardation and a birefringent film of small retardation in such a manner that their optical axes cross each other at right angles. The compensating film could theoretically function as a λ/4 plate in the overall range of visible light, so far as the difference in retardation between the laminated two films is λ/4 in the overall range of visible light. JP-A 68816/1998 discloses an optical compensating film capable of attaining λ/4 in a broad wavelength range, which is fabricated by laminating a polymer film of λ/4 in a specific wavelength range and a polymer film of λ/2 of the same material in the same wavelength range as that of the former. JP-A 90521/1998 also discloses an optical compensating film fabricated by laminating two polymer films and capable of attaining λ/4 in a broad wavelength range. However, the optical compensating film of the type fabricated by laminating two films has various problems in that it is thick and its cost is high. Therefore, an optical compensating film of a single film that realizes λ/4 in a broad wavelength range is desired.

In this connection, JP-A 2000-137116 and WO 00/65384 have a description relating to an optical compensating film of a single polymer film of which the phase retarder reduces in a shorter wavelength range, and to its application to circularly polarizing plates and reflection liquid crystal displays. As the parameter of controlling the view angle characteristic of the above-mentioned λ/4 plate, employed is a numerical value defined by (nx−nz)/(nx−ny) (this is hereinafter referred to as an NZ factor). nx, ny and nz indicate the refractive index along the slow axis in plain (the maximum refractive index in plain) of the phase retarder, the refractive index perpendicular to the slow axis in plane of the phase retarder, and the refractive index along the thickness direction, respectively. WO 00/65384 says that the preferred range of the NZ factor is $1 \leq NZ \leq 2$.

Preferably, the NZ factor is controllable. This is because, in a liquid crystal display for image formation, the birefringence (Δn) of the liquid crystal cell varies depending on the liquid crystal panel therein and the angle-dependency of Δn also varies depending on the liquid crystal panel. Therefore, if the NZ factor of the optical compensating film in the display is controllable, the view angle characteristic of the display can be optimized, requiring no change of the retardation value Re of the film.

However, the NZ factor is defined by the refractive indices in three directions of the film, and is therefore correlated with the draw ratio of the film. Concretely, when the draw ratio of the film in the machine direction increases more and therefore the film is most likely in monoaxial orientation, then the NZ factor of the film comes nearer to 1 from a larger value. In case where a λ/4 plate is fabricated according to the width-unlimited monoaxial stretching method described in the Examples in WO 00/65384, the draw ratio of the film that realizes a retardation of λ/4 is determined by the elongation at break of the film, and therefore the NZ factor of the film shall be indiscriminately determined.

DISCLOSURE OF THE INVENTION

One object of the present invention is to provide a method for producing an optical compensating film (especially, a λ/4 plate that attains a phase shift of λ/4 in a broad wavelength range), of which can control NZ factor without a retardation change in the film, and which has a good view angle characteristic, and to provide such an optical compensating film having the advantages as above.

Another object of the invention is to provide a polarizing plate that comprises the optical compensating film as above and has a good view angle characteristic, and to provide an image display device (especially, a reflection or semi-transmission liquid crystal display, and an organic electroluminescent (EL) device-having display) that comprises the optical compensating film or the polarizing plate as above.

According to the invention, there are provided a method for producing an optical compensating film, an optical compensating film, a polarizing plate, and a liquid crystal display mentioned below, which attain the above-mentioned objects of the invention.

1. A method for producing an optical compensating film, which comprises stretching a cellulose acetate film, the cellulose acetate film having a water content of 2.0 to 20.0% by weight, wherein the cellulose acetate for the film has an acetyl value of from 57.0% to 62.5%.

2. The method for producing an optical compensating film as described in above 1, wherein the optical compensating film has a retardation value measured at a wavelength of 550 nm (Re550) of 20 nm to 2000 nm: 20 nm≦Re550≦2000 nm.

3. The method for producing an optical compensating film as described in above 1 or 2, wherein the optical compensating film has a distribution of the retardation value measured at a wavelength of 550 nm (Re550) of 10% or less in both a width direction and a longitudinal direction of the film.

4. The method for producing an optical compensating film as described in any of above 1 to 3, wherein the optical compensating film has:

the retardation value measured at a wavelength of 450 nm (Re450) of 60 to 135 nm; and the retardation value measured at a wavelength of 590 nm (Re590) of 100 to 170 nm, and the stretched film satisfies the condition: (Re590−Re450)≧2 nm.

5. The method for producing an optical compensating film as described in any of above 1 to 4, wherein the optical compensating film satisfies the conditions: 0.5<Re450/Re550<0.98; and 1.01<Re650/Re550<1.35, in which Re450, Re550 and Re650 represent the retardation values measured at a wavelength of 450 nm, 550 nm and 650 nm, respectively.

6. The method for producing an optical compensating film as described in any of above 1 to 5, wherein the cellulose acetate film is dipped in water and/or exposed to water vapor to absorb water, before the stretch.

7. The method for producing an optical compensating film as described in any of above 1 to 6, wherein no water film is substantially formed on the surface of the cellulose acetate film when the cellulose acetate film is stretched.

8. The method for producing an optical compensating film as described in any of above 1 to 7, wherein the water content of the cellulose acetate film just after having been stretched is 2.0 to 20.0% by weight.

9. The method for producing an optical compensating film as described in any of above 1 to 8, wherein, when L indicates the distance between the fixing members for fixing the cellulose acetate film when stretching and W indicates the width of the cellulose acetate film measured in the direction perpendicular to the fixing member-to-fixing member direction, the aspect ratio: L/W satisfies the condition: 0.1≦L/W≦2.

10. The method for producing an optical compensating film as described in any of above 1 to 9, which comprises a step of stretching the cellulose acetate film between at least two pairs of nip rolls by a difference in the rotation speed between the at least two pairs of nip rolls.

11. The method for producing an optical compensating film as described in above 10, wherein, when W' (cm) indicates the width of the cellulose acetate film and L' (cm) indicates the distance between the at least two pairs of nip rolls, the aspect ratio: L'/W' satisfies the condition: 0.5≦L'/W'≦2.

12. The method for producing an optical compensating film as described in any of above 1 to 11, wherein the film is stretched in water.

13. The method for producing an optical compensating film as described in any of above 1 to 11, wherein the film is stretched in air.

14. The method for producing an optical compensating film as described in any of above 1 to 11, wherein the film is stretched in water vapor having a relative humidity of from 60% to 100%.

15. The method for producing an optical compensating film as described in any of above 1 to 14, wherein the film is stretched at a temperature of 50° C. to 150° C.

16. The method for producing an optical compensating film as described in any of above 1 to 15, wherein the film is stretched with a draw ratio of from 1.1 times to 2.0 times.

17. The method for producing an optical compensating film as described in any of above 1 to 16, wherein the stretching time is 1 second to 30 seconds.

18. The method for producing an optical compensating film as described in any of above 1 to 17, wherein the optical compensating film satisfies the condition: 1≦(nx−nz)/(nx−ny)≦3, in which nx indicates the refractive index along the slow axis in plain of the optical compensating film, ny indicates the refractive index perpendicular to the slow axis in plane of the optical compensating film, and nz indicates the refractive index of the film in the direction of the thickness thereof.

19. The method for producing an optical compensating film as described in any of above 1 to 18, wherein the optical compensating film has a haze value of 0 to 2%.

20. The method for producing an optical compensating film as described in any of above 1 to 19, wherein the cellulose acetate film contains an aromatic compound having at least two aromatic rings in an amount of from 0.01 to 20 parts by weight, based on 100 parts by weight of the film.

21. An optical compensating film produced according to the method for producing an optical compensating film as described in any of above 1 to 20.

22. A polarizing plate, which is a laminate including:

the optical compensating film produced according to the method for producing an optical compensating film as described in any of above 1 to 20; and at least one of a polarizing film and a polarizing plate.

23. An image display comprising at least one of:

the optical compensating film produced according to the method for producing an optical compensating film as described in any of above 1 to 20; and the polarizing plate as described in above 22.

BEST MODES OF CARRYING OUT THE INVENTION

Figure 1:
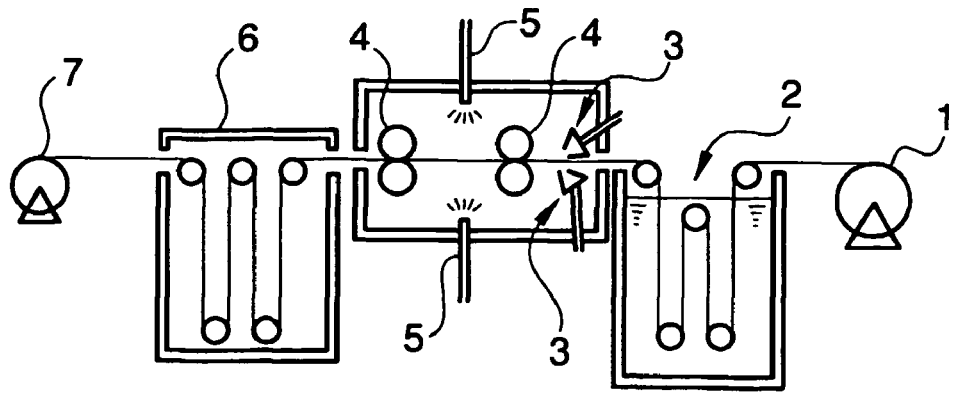
FIG. 1 is a schematic view showing a stretching step in which the film to be stretched is dipped in water to absorb water and then stretched in water vapor.

We, the present inventors have found that, when a cellulose acetate film having an acetyl value (a degree of acetylation) of from 57.0% to 62.5% is made to positively absorb water and then stretched, its NZ factor can be controlled. On the basis of this finding, the inventors have attained the optical compensating film of the invention that has good optical properties. The invention is described in more detail hereinunder.

[Acetate Film]

For the cellulose acetate film of the invention, preferably used is cellulose acetate having a degree of acetylation of from 57.0% to 62.5%, more preferably from 58.0% to 62.0%.

The acetyl value (degree of acetylation) is meant to indicate the amount of acetic acid bonded to the cellulose unit by weight. The acetyl value may be measured and computed according to ASTM D-817-91 (test method of cellulose acetate).

The viscosity-average degree of polymerization (DP) of the cellulose acetate is preferably at least 250, more preferably at least 290.

The cellulose acetate for use in the invention preferably has a narrow molecular weight distribution of Mw/Mn (Mw is a weight-average molecular weight, and Mn is a number-average molecular weight) measured through gel permeation chromatography. Concretely, the Mw/Mn value of the cellulose acetate is preferably from 1.0 to 1.7, more preferably from 1.3 to 1.65, and most preferably from 1.4 to 1.6.

Also preferably, the cellulose acetate film for use herein has a light transmittance of at least 80%.

[Water Content and Water Absorption]

The cellulose acetate film has a water content of 1.8% by weight at room temperature. In general, the cellulose acetate film (original film) is heated up to around its glass transition point (Tg) so as to be stretchable, and then it is stretched. When the film is heated up to around its glass transition point, for example, up to 130° C., its water content further reduces and it will be 0.4% by weight. The invention is characterized in that the cellulose acetate film (original film) in that condition is made to absorb water before it is stretched, and the film to be stretched is made to have a water content of from 2.0% by weight to 20.0% by weight, but preferably from 2.5% by weight to 18.0% by weight, more preferably from 3.0% by weight to 16.0% by weight.

The water content of the film is the water fraction (% by weight) contained in the film. Concretely, it is indicated by the following:

Water content (% by weight)=0.1×($W/F$)

wherein W represents the amount of water (μg) in the film sample measured, which is indicated by the moisture meter used for the measurement; and F represents the amount of the film sample (mg) measured.

Having the controlled water content of from 2.0% by weight to 20.0% by weight, the cellulose acetate film to be stretched may have a lowered glass transition point (Tg). For example, its Tg may be lowered from 130° C. (when its water content is 0.4% by weight) to 75° C. (when its water content is 5.5% by weight). Accordingly, the film can be uniformly stretched at a temperature lower than the ordinary stretching temperature (130° C.) thereof.

Tg of the cellulose acetate film having a water content of 5.5% by weight is measured as follows: The film is dipped in water in a closed silver pan (70 μl), and its Tg is measured with a varying temperature-dependent DSC (TA Instrument's DSC2910).

In the invention, the cellulose acetate film (original film) to be stretched is made to absorb water before it is stretched, whereby its water content can be controlled to fall within the defined range as above.

For making it absorb water, the cellulose acetate film to be stretched is dipped in water (water bath method) or exposed to water vapor (water vapor method), or the two methods may be combined.

When the film is dipped in water, the water temperature preferably falls between 60° C. and 100° C., more preferably between 70° C. and 100° C., even more preferably between 75° C. and 100° C. Concretely, the cellulose acetate film to be processed is passed through a water tank filled with water having a temperature that falls within the defined range, while conveyed by rolls set in the water tank in which it takes from 0.1 to 20 minutes, preferably from 0.2 to 10 minutes, more preferably from 0.5 to 5 minutes between the rolls. Thus passed through the water tank, the film absorbs water.

For exposure to water vapor, the film may be exposed to water vapor preferably having a temperature of from 60° C. to 150° C., more preferably from 70° C. to 140° C., even more preferably from 75° C. to 130° C., and having a relative humidity of from 70% to 100%, more preferably from 80% to 100%, even more preferably from 85% to 100%, for a period of from 0.1 to 20 minutes, more preferably from 0.2 to 10 minutes, even more preferably from 0.5 to 5 minutes. Thus exposed to water vapor, the film absorbs water. For example, rolls are set in a room filled with such water vapor, and the cellulose acetate film to be processed is conveyed by the rolls in the room to absorb water.

Water in which the film is dipped or water for water vapor to which the film is exposed may be any and every one that is substantially water. The one that is substantially water is meant to indicate a substance of which the water content is substantially at least 60% by weight, and it may contain any of organic solvents, plasticizers, surfactants and others except water. The organic solvent that may be in water for use in the invention is preferably a water-soluble organic solvent having from 1 to 10 carbon atoms. Preferably, however, water accounts for at least 90% by weight of the water mixture for use herein, more preferably at least 95% by weight. Most preferably, water for use herein is pure water.

The water bath method and the water vapor method may be combined or may be carried out separately. Especially preferably, the water vapor method is employed singly.

Before the cellulose acetate film thus processed to absorb water is stretched, it is desirable that no water film is substantially formed on its surface. A water film is readily formed on the surface of the cellulose acetate film processed in the manner as above to absorb water, but if it is kept still remaining on the surface of the cellulose acetate film being stretched, the cellulose acetate film will slip on film-fixing members such as nip rolls while it is stretched between them. If so, the film could not be stretched with a desired draw ratio and, in addition, it will be readily scratched.

The condition that "no water film is substantially formed on the surface of the cellulose acetate film being stretched" in the invention is meant as follows: Filter paper is pressed against the cellulose acetate film to be stretched, and the area of the filter paper having absorbed water from the film is measured. The area thus measured is at most 30% of the overall area of the filter paper.

For removing the water film from the wetted cellulose acetate film, one preferred method comprises applying a jet of air onto the surface of the wetted cellulose acetate film through an air knife after processing of absorbing water to thereby blow off water from the surface of the film. In this method, if the vapor to be jetted out of the air knife is dry air, the water inside the film will easily evaporate away. Therefore, it is desirable that air having a relative humidity of from 70% to 100% is jetted out onto the surface of the wetted cellulose acetate film. As the case may be, water on the surface of the film may be scraped away with a rubber blade or the like, or the film may be contacted with a roll covered with a water-absorbing cloth to thereby remove water from its surface. These methods may be effected singly or may be combined. Of those, especially preferred is the method of using an air knife for water removal from the film surface.

Preferably, the water removal from the film surface is carried out in a casing in which the atmosphere has a relative humidity of from 70% to 100%. Also preferably, the temperature in the casing is controlled to fall between 60° C. and 150° C.

[Stretching Method]

The atmosphere in which the film is stretched may be any of air, water vapor or water.

Stretching in air means that the film is stretched in air of which the temperature is specifically controlled but the humidity is not. Preferably, the stretching temperature falls between 50° C. and 150° C., more preferably between 60° C. and 130° C., even more preferably between 65° C. and 110° C.

Stretching in water vapor means that the film is exposed to an atmosphere having a constant temperature and a high humidity or to water vapor. Preferably, the stretching temperature falls between 50° C. and 150° C., more preferably between 60° C. and 140° C., even more preferably between 70° C. and 130° C. Also preferably, the relative humidity in the water vapor atmosphere falls between 60% RH and 100% RH. In that condition, the water content of cellulose acetate to constitute the film being stretched is kept between 2.0% by weight and 20.0% by weight. If the water content of the film being stretched is lower than 2.0% by weight, the elongation at break thereof is low and the film is readily broken, and, as a result, the retardation value Re550 of the stretched film measured at a wavelength of 550 nm could not reach $\lambda/4$.

Stretching in water means that the film is stretched while dipped in water in a water tank. Preferably, the temperature of the water falls between 50° C. and 100° C., more preferably between 60° C. and 98° C., even more preferably between 65° C. and 95° C. Also preferably, the dipping time falls between 0.5 seconds and 10 minutes, more preferably between 1 second and 8 minutes, even more preferably between 1 second and 7 minutes.

In stretching the film, the aspect ratio L/W preferably falls between 0.05 and 4, more preferably between 0.1 and 3, even more preferably between 0.1 and 2, in which L indicates the distance between the fixing members by which the film to be stretched is fixed and W indicates the width of the film measured in the direction perpendicular to the fixing member-to-fixing member distance.

Preferably, the water content of the film just after having been stretched is kept still falling between 2.0% by weight and 20.0% by weight, since the film in that condition can be uniformly stretched. More preferably, it is kept falling between 2.1% by weight and 18.0% by weight, even more preferably between 2.2% by weight and 16.0% by weight. The water content of the non-stretched film just before the stretching zone in which it is to be stretched is controlled to fall between 2.0% by weight and 20.0% by weight. Therefore, if the water content of the film just after having been stretched is lower than 2.0% by weight, the elongation at break of the stretched film will be low and the front retardation of the film having a desired thickness could not reach the region of $\lambda/4$.

The water content of the film just after having been stretched is meant to indicate the water content of the film just after the step of stretching the film.

If desired, water having adhered to the stretched film maybe removed before the film is wound up. For this, employable is any known method of using an air knife, a blade or the like.

The film may be stretched in any direction of machine (longitudinal) or transverse (width) direction. As the case may be, the film may be stretched in both the machine direction and the transverse direction. The machine direction means the direction in which the film runs through the stretching apparatus; and the transverse direction means the direction that is perpendicular to the machine direction. Especially preferably, the film is monoaxially stretched in any of the machine or transverse direction. More preferably, it is monoaxially stretched in the machine direction.

Stretching the film may be effected in any known manner of, for example, zone stretching, roll stretching or tenter stretching. If desired, the film may be stretched between clips that clip it. In the method of using clips for stretching the film therebetween, the two ends of the rectangular film are clipped by fixing members such as clips so that the film does not slip, and the thus-fixed film is stretched. Also preferred is the method of stretching the film between rolls, in which the film may be stretched in one stage or in multiple stages. In this, the rolls may be disposed in parallel to the film or may cross the film. The rolls are not specifically defined, for which, however, preferred are nip rolls, jacket rolls and expander rolls. More preferred are nip rolls that have the advantage of stretching stability.

Preferably, the draw ratio of the film being stretched falls 1.1 times and 2.0 times, more preferably between 1.15 times and 1.9 times, even more preferably between 1.2 times and 1.8 times. The film may be stretched in one stage or in multiple stages. In case where the film is stretched in multiple stages, the product of the draw ratios in each stage shall fall within the defined range.

The stretching speed may fall between 10%/min and 1000%/min, but more preferably between 20%/min and 800%/min, even more preferably between 30%/min and 700%/min.

Preferably, the stretching time falls between 1 and 30 seconds, more preferably between 2 and 25 seconds, even more preferably between 3 and 20 seconds.

Preferably, the thickness of the non-stretched film (film before stretch) falls between 40 µm and 300 µm, more preferably between 45 µm and 280 µm, even more preferably between 50 µm and 250 µm. Also preferably the thickness of the stretched film (film after stretch) falls between 40 µm and 250 µm, more preferably between 50 µm and 230 µm, even more preferably between 60 µm and 200 µm.

Preferably, the width of the non-stretched film falls between 5 cm and 3 m, more preferably between 8 cm and 2.5 m, even more preferably between 10 cm and 2 m.

The stretched film is preferably dried. The drying temperature preferably falls between 40° C. and 150° C., more preferably between 50° C. and 130° C., even more preferably between 60° C. and 120° C. The drying time preferably fall between 10 seconds and 20 minutes, more preferably between 20 seconds and 10 minutes, even more preferably between 30 seconds and 7 minutes.

It is desirable that the stretched film is dried while it is conveyed to the next stage. Preferably, the tension under which the film is conveyed falls between 1 kg/m and 50 kg/m, more preferably between 3 kg/m and 30 kg/m, even more preferably between 5 kg/m and 20 kg/m.

[Stretching Method with Nip Rolls]

The method of stretching the film with nip rolls is described in detail hereinunder.

At least two pairs, more preferably from 2 pairs to 8 pairs, even more preferably from 2 pairs to 6 pairs of nip rolls are used for stretching the film.

The method of using two pairs of nip rolls is for one-stage stretching; and the method of using three or more pairs of nip rolls is for multi-stage stretching. A nip pressure is applied to the paired nip rolls, and the cellulose acetate film to be stretched is passed between the thus-pressured paired nip rolls while the rotation speed of one pair of roll is made different from that of the other. Thus having been passed through the paired nip rolls in that condition, the film is stretched. Concretely, the rotation speed of the nip roll on the outlet side (on the downstream side) in the film-traveling direction is made higher than that of the other nip roll on the inlet side (on the upstream side), and the film running through the nip rolls in that condition is stretched and drawn.

Two nip rolls are paired for stretching the film therebetween, and it is desirable that one or both of them is/are covered with rubber. In the invention, the water content of the film to be stretched is high and the film often slips while it is stretched. Therefore, rubber-coated rolls are preferred for stretching the film. The rubber material may be any of natural rubber or synthetic rubber (e.g., neoprene rubber, styrene-butadiene rubber, silicone rubber, urethane rubber, butyl rubber, nitrile rubber, chloroprene rubber). Preferably, the thickness of the rubber coating falls between 1 mm and 50 mm, more preferably between 2 mm and 40 mm, even more preferably between 3 mm and 30 mm.

Also preferably, the diameter of each nip roll falls between 5 cm and 100 cm, more preferably between 10 cm and 50 cm, even more preferably between 15 cm and 40 cm.

Preferably, the nip rolls for use herein are hollow rolls of which the temperature can be controlled in their hollow inside.

Regarding the roll-to-roll distance, it is desirable that the aspect ratio L'/W' satisfies $0.5 \leq L'/W' \leq 2$, more preferably $0.7 \leq L'/W' \leq 1.8$, even more preferably $0.9 \leq L'/W' \leq 1.6$, in which W' (cm) indicates the width of the cellulose acetate film and L' (cm) indicates the distance between the nip rolls. In case where three or more pairs of nip rolls are used, the ratios L'/W' of every pair of rolls shall be averaged. In general, the aspect ratio of the nip rolls for film stretching is larger than 2. In the invention, it is a matter of importance that the aspect ratio of the nip rolls to be used is kept small while the water content of the film to be stretched between them is specifically controlled as defined herein, for optimizing the NZ factor of the stretched film.

The nip pressure to be applied to the nip rolls preferably falls between 0.5 t/m width and 20 t/m width, more preferably between 1 t/m width and 10 t/m width, even more preferably between 2 t/m width and 7 t/m width.

In case where the film is stretched between such nip rolls, the stretching temperature preferably falls between 50° C. and 150° C., more preferably between 60° C. and 140° C., even more preferably between 70° C. and 130° C. In general, the temperature for film stretching is unified both in the transverse direction and in the machine direction. In the invention, however, it is desirable that the film-stretching temperature is not unified in at lease one direction. Preferably, the temperature difference in stretching the film in the invention falls between 1° C. and 20° C., more preferably between 2° C. and 17° C., even more preferably between 2° C. and 15° C.

The film having a specific water content as in the invention has a lowered glass transition point (Tg), and it can be stretched even under low tension. However, the film is often necked in while stretched, and it will be unevenly stretched. To solve the problem, a temperature profile of the film being stretched is effective, which is described below.

(i) Temperature Profile in Machine Direction:

In film stretching with nip rolls, stress will often concentrate in the upstream nip roll outlet (this is the stretching start point), and the film locally receives too much stress in that site, and, as a result, the film could not often be stretched uniformly. Specifically, for uniformly stretching the film in the entire region in which the film is stretched, it is desirable that the temperature at the site immediately after the upstream nip roll is made lower than the mean temperature in the stretching zone (that is, the temperature in the center of the stretching zone in the machine direction) by the temperature difference mentioned above. The temperature profile in stretching the film may be attained, for example, as follows: A temperature-controllable roll is used for the upstream nip roll and its temperature is lowered; or a split heat source (e.g., radiation heat source such as IR heater, or heat jet with multiple jet mouths) is disposed along the film in its machine direction.

(ii) Temperature Profile in Transverse Direction:

The film having the aspect ratio mentioned above is often unevenly stretched in the transverse direction thereof. Specifically, both edges of the film are more stretched than the center part thereof. To solve the problem, therefore, it is desirable that the temperature of both edges of the film being stretched is kept higher than that of the center part thereof in the transverse direction by the temperature difference mentioned above. The temperature profile in stretching the film may be attained, for example, by disposing a split heat source (e.g., radiation heat source such as IR heater, or heat jet with multiple jet mouths) around the film in its transverse direction.

Preferably, the film is stretched between the nip rolls under the condition as above, for a period of time falling between 1 and 30 seconds, more preferably between 2 and 25 seconds, even more preferably between 3 and 20 seconds.

One embodiment of film stretching with nip rolls is described hereinabove.

Other embodiments of film stretching in the invention are described below, which may apply not only to nip rolls but also any others.

[Embodiments of Outline Constitution of Stretching Method]

Figure 2:
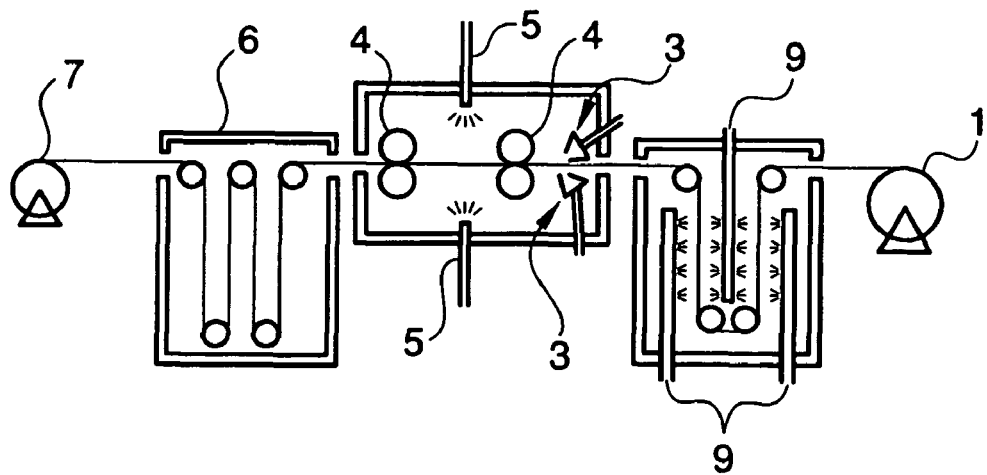
FIG. 2 is a schematic view showing a stretching step in which the film to be stretched is exposed to water vapor to absorb water and then stretched in water vapor.

FIG. 1 to FIG. 6 show the outline constitution of some embodiments of the stretching method employable in the invention. (In the following description, the parenthesized numerals correspond to the numerals in the drawings.) Of those, the constitution of FIG. 1 and FIG. 2 is preferred; and the constitution of FIG. 2 is more preferred.

In FIG. 1, the film to be stretched is dipped in water to absorb water and then stretched in water vapor. As illustrated, the film fed from a feed roll (1) is conveyed through a water tank (2), in which it absorbs water to have a water content as specifically defined herein. As so mentioned hereinabove, it is desirable that the water in the tank is heated. Having passed through the water tank, the film is then led into a stretching zone, in which the water film on the film surface is first removed by air knives (3), and then the film is stretched between two pairs of nip rolls (4).

Concretely, the rotation speed of the nip rolls on the winding-up side (on the outlet side) is kept higher than that of the nip rolls on the feeding-out side (on the inlet side), whereby the film is stretched and drawn between the nip rolls. In this stage, the stretching zone has steam jet mouths (5), via which steam is jetted out thereinto and the humidity in the stretching zone is kept within the range as above. The stretching zone may have multiple steam jet mouths (5) set therein so as to further stabilize the humidity therein. As the case may be, a heater (not shown) may be disposed inside the stretching zone so as to control the temperature therein to a predetermined one. After thus stretched, the film is led through a drying zone (6) and then wound up around a wind-up roll (7).

Figure 5:
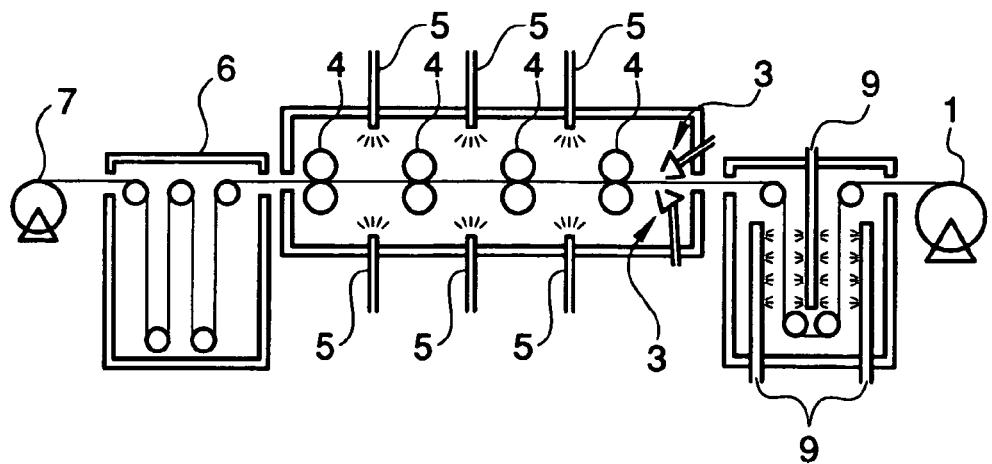
FIG. 5 is a schematic view showing a stretching step in which the film to be stretched is exposed to water vapor to absorb water and then stretched in water vapor.

In FIG. 2 and FIG. 5, the film to be stretched is exposed to water vapor to absorb water and then stretched in water vapor. As illustrated, the film fed out from the roll is exposed to water vapor that jets out toward it through jet mouths (9), and it absorbs water. The others are the same as those in FIG. 1.

Figure 3:
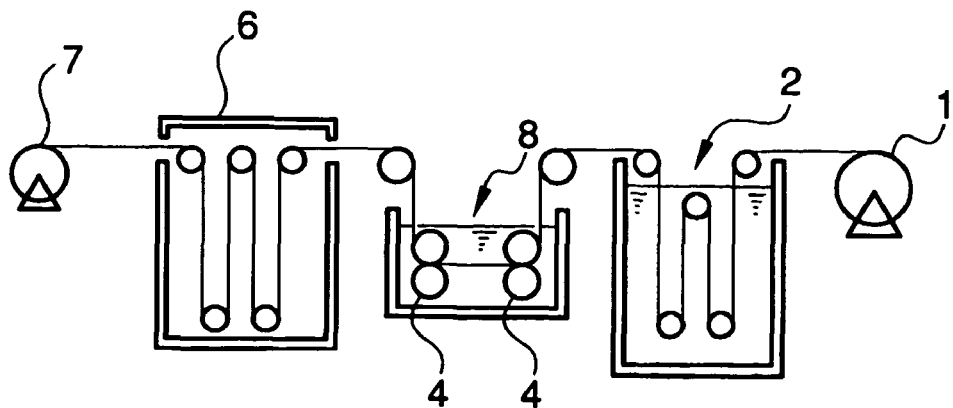
FIG. 3 is a schematic view showing a stretching step in which the film to be stretched is dipped in water to absorb water and then stretched in water.

In FIG. 3, the film to be stretched is dipped in water to absorb water and then stretched in water. Like in FIG. 1, the film is dipped in water to absorb water, and then stretched between the nip rolls set in a water tank (8). Preferably, the water in the water tank is heated, as so mentioned hereinabove. After thus stretched, the film is dried and wound up in the same manner as in FIG. 1.

Figure 4:
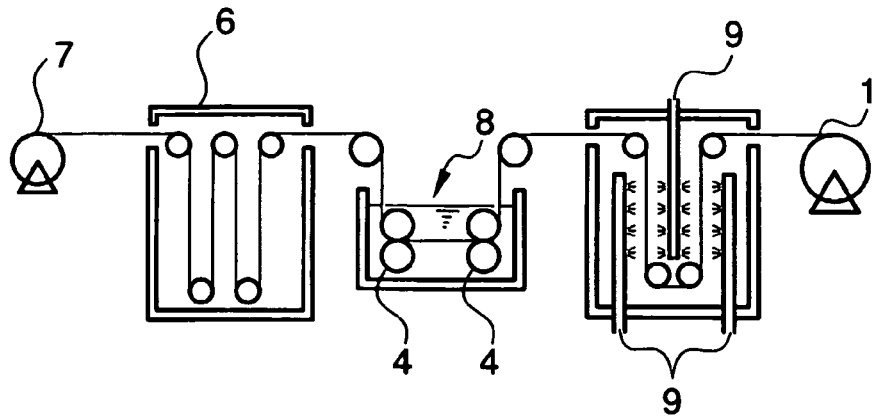
FIG. 4 is a schematic view showing a stretching step in which the film to be stretched is exposed to water vapor to absorb water and then stretched in water.
Figure 6:
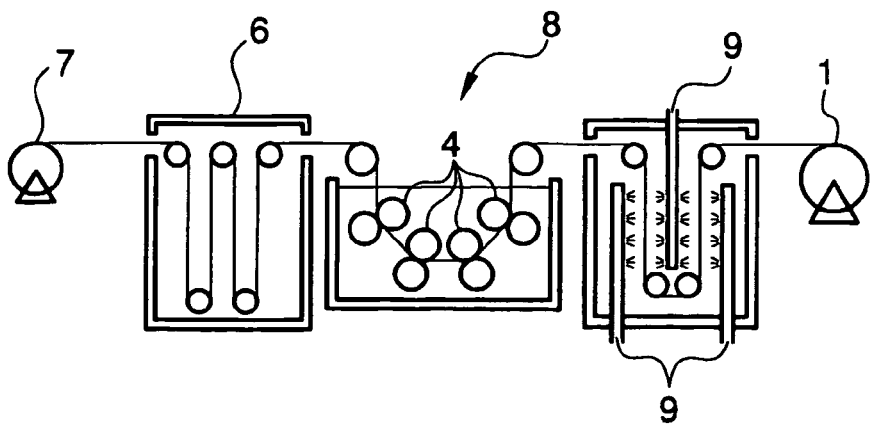
FIG. 6 is a schematic view showing a stretching step in which the film to be stretched is exposed to water vapor to absorb water and then stretched in water.

In FIG. 4 and FIG. 6, the film to be stretched is exposed to water vapor to absorb water and then stretched in water. Like in FIG. 2, the film is processed to absorb water, and then this is stretched in the same manner as in FIG. 3. After thus stretched, the film is dried and wound up in the same manner as in FIG. 1.

[Film Retardation]

The film retardation value (Re) is computed according to the following equation:

Retardation Value $(Re) = (nx - ny) \times d$ wherein nx indicates the refractive index along the slow axis in plain of the optical compensating film (the maximum refractive index in plain of the optical compensating film); ny indicates the refractive index perpendicular to the slow axis in plane of the optical compensating film, and d indicates the thickness (nm) of the optical compensating film.

Preferably, the retardation measured at a wavelength of 550 nm, Re550 of the optical compensating film of the invention falls between 20 nm and 2000 nm, more preferably between 40 nm and 500 nm, even more preferably between 80 nm and 300 nm.

Also preferably, the distribution of the retardation value measured at a wavelength of 550 nm, Re550 of the optical compensating film is at most 10% in both the transverse direction and the machine direction of the film.

In particular, in case where the optical compensating film of the invention is used for a $\lambda/4$ plate, it is desirable that the retardation value measured at a wavelength of 450 nm (Re450) of the film falls between 60 and 135 nm, the retardation value measured at a wavelength of 590 nm (Re590) thereof falls between 100 and 170 nm, and the film satisfies Re590−Re450≧2 nm. More preferably, the film satisfies Re590−Re450≧5 nm, most preferably Re590−Re450≧10 nm.

In case where the optical compensating film of the invention is used for a $\lambda/2$ plate, it is desirable that the retardation value measured at a wavelength of 450 nm (Re450) of the film falls between 120 and 270 nm, the retardation value measured at a wavelength of 590 nm (Re590) thereof falls between 200 and 340 nm, and the film satisfies Re590−Re450≧4 nm. More preferably, the film satisfies Re590−Re450≧10 nm, most preferably Re590−Re450≧20 nm.

In any case of using the film for a $\lambda/4$ plate or $\lambda/2$ plate, it is desirable that the retardation value measured at a wavelength of 450 nm, 550 nm or 650 nm: Re450, Re550 and Re650 of the film satisfy the following:

$0.5 < Re450/Re550 < 0.98$, $1.01 < Re650/Re550 < 1.35$.

More preferably, $0.6 < Re450/Re550 < 0.95$, $1.05 < Re650/Re550 < 1.3$.

Even more preferably, $0.7 < Re450/Re550 < 0.9$, $1.1 < Re650/Re550 < 1.25$.

[NZ Factor]

Preferably, the cellulose acetate film used singly in the invention satisfies the following equation:

$1 \leq (nx-nz)/(nx-ny) \leq 3$ wherein nx indicates the refractive index along the slow axis in plain of the optical compensating film, ny indicates the refractive index perpendicular to the slow axis in plane of the optical compensating film, and nz indicates the refractive index of the film in the direction of the thickness thereof.

In the invention, the NZ factor is a value indicated by $(nx-nz)/(nx-ny)$. Preferably, the NZ factor falls between 1.1 and 2.8, more preferably between 1.2 and 2.7, even more preferably between 1.5 and 2.5. Satisfying the condition, the method of the invention produces better results.

[Haze]

The haze of the optical compensating film of the invention is computed according to the equation mentioned below, and it is preferably at most 2.0%, more preferably at most 1.0%, most preferably at most 0.6%.

$$\text{Haze }(HZ) = [\text{diffusion }(D)/\text{total transmittance }(T)] \times 100(\%)$$

wherein the diffusion (D) indicates the intensity of the light diffused by the film, and this is measured with a haze meter; and the total transmittance (T) indicates the mean transmittance of visible light of from 400 to 700 nm, through the film.

The optical compensating film of a cellulose acetate film having the above-mentioned optical properties may be produced, using the materials mentioned below.

[Retardation-Controlling Agent]

For controlling the retardation value of the film at different wavelengths, it is desirable that a retardation-controlling agent is added to cellulose acetate for the film.

Preferably, the amount of the retardation-controlling agent to be added to cellulose acetate falls between 0.01 and 30 parts by weight relative to 100 parts of cellulose acetate, more preferably between 0.05 and 25 parts by weight, even more preferably between 0.1 and 20 parts by weight. If desired, two or more different types of retardation-controlling agents may combined and used herein.

Preferably, the retardation-controlling agent for use herein has a maximum absorption wavelength in a wavelength range of from 210 to 360 nm. Also preferably, the retardation-controlling agent does not substantially absorb visible light.

For the retardation-controlling agent, preferred are compounds having at least two "aromatic rings". The "aromatic ring" referred to herein includes aromatic hydrocarbon rings and aromatic hetero-rings.

Especially preferably, the aromatic hydrocarbon ring to be in the compound for the agent is a 6-membered ring (i.e., benzene ring).

The aromatic hetero-rings are generally unsaturated hetero-rings, for which preferred are 5-membered, 6-membered and 7-membered rings. More preferred are 5-membered and 6-membered rings. The aromatic hetero-rings generally have a largest number of double bonds. For the heteroatom in these, preferred are nitrogen, oxygen and sulfur atoms; and more preferred is a nitrogen atom. Examples of the aromatic hetero-rings include furan, thiophene, pyrrole, oxazole, isoxazole, thiazole, isothiazole, imidazole, pyrazole, furazane, triazole, pyran, pyridine, pyridazine, pyrimidine, pyrazine and 1,3,5-triazine rings.

For the aromatic rings, for example, preferred are benzene, furan, thiophene, pyrrole, oxazole, thiazole, imidazole, triazole, pyridine, pyrimidine, pyrazine and 1,3,5-triazine rings.

Preferably, the number of such aromatic rings to be in the compound for the retardation-controlling agent for use herein is from 2 to 20, more preferably from 2 to 12, most preferably from 2 to 6.

The retardation-controlling agent of the type may be any of (α) tabular compounds or (β) rod compounds mentioned below. One or more these compounds may be used either singly or as combined for the agent.

(α) Tabular Compounds:

The tabular compounds each contain at least two pairs of aromatic rings, in which the bonding mode of the two aromatic rings is grouped into (a) a case of forming a condensed ring, (b) a case of directly bonding to each other via a single bond, and (c) a case of bonding to each other via a linking group (however, the aromatic rings could not form a spiro bond). In the compounds, the bonding mode of the aromatic rings may be any of (a) to (c).

Examples of the case (a) condensed ring (composed of at least two aromatic rings) include indene, naphthalene, azulene, fluorene, phenanthrene, anthracene, acenaphthylene, biphenylene, naphthacene, pyrene, indole, isoindole, benzofuran, benzothiophene, indolidine, benzoxazole, benzothiazole, benzimidazole, benzotriazole, purine, indazole, chromene, quinoline, isoquinoline, quinolidine, quinazoline, cinnoline, quinoxaline, phthalazine, pteridine, carbazole, acridine, phenanthridine, xanthene, phenazine, phenothiazine, phenoxthine, phenoxazine and thianthrene rings. Of those, preferred are naphthalene, azulene, indole, benzoxazole, benzothiazole, benzimidazole, benzotriazole and quinoline rings.

The single bond in (b) is preferably a carbon-carbon bond that bonds two aromatic rings. If desired, however, two or more single bonds may bond two aromatic rings to thereby form an aliphatic ring or a non-aromatic hetero-ring between the thus-bonded two rings.

Also preferably, the linking group in (c) bonds to the carbon atoms of two aromatic rings. Preferred examples of the linking group are an alkylene group, an alkenylene group, an alkynylene group, —CO—, —O—, —NH—, —S—, and their combinations. Some examples of combined linking groups are mentioned below, in which the right and left configurations of the linking groups may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic rings and the linking groups may have substituents.

Examples of the substituents include a halogen atom (F, Cl, Br, I), a hydroxyl group, a carboxyl group, a cyano group, an amino group, a nitro group, a sulfo group, a carbamoyl group, a sulfamoyl group, an ureido group, an alkyl group, an alkenyl group, an alkynyl group, an aliphatic acyl group, an aliphatic acyloxy group, an alkoxy group, an alkoxycarbonyl group, an alkoxycarbonylamino group, analkylthio group, an alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group, and a non-aromatic heterocyclic group.

Preferably, the alkyl group has from 1 to 8 carbon atoms. For it, an acyclic alkyl group is preferred to a cyclic alkyl group, and a linear alkyl group is especially preferred. The alkyl group may be further substituted (for example, with any of a hydroxyl group, a carboxyl group, an alkoxy group and an alkyl-substituted amino group). Examples of the alkyl group (including substituted alkyl groups) are methyl, ethyl, n-butyl, n-hexyl, 2-hydroxyethyl, 4-carboxybutyl, 2-methoxyethyl and 2-diethylaminoethyl groups.

Preferably, the alkenyl group has from 2 to 8 carbon atoms. For it, an acyclic alkenyl group is preferred to a cyclic alkenyl group, and a linear alkenyl group is especially preferred. The alkenyl group may be further substituted. Examples of the alkenyl group include vinyl, allyl and 1-hexenyl groups.

Preferably, the alkynyl group has from 2 to 8 carbon atoms. For it, an acyclic alkynyl group is preferred to a cyclic alkynyl group, and a linear alkynyl group is especially preferred. The alkynyl group may be further substituted. Examples of the alkynyl group include ethynyl, 1-butynyl and 1-hexynyl groups.

Preferably, the aliphatic acyl group has from 1 to 10 carbon atoms. Examples of the aliphatic acyl group include acetyl, propanoyl and butanoyl groups.

Preferably, the aliphatic acyloxy group has from 1 to 10 carbon atoms. One example of the aliphatic acyloxy group is an acetoxy group.

Preferably, the alkoxy group has from 1 to 8 carbon atoms. The alkoxy group may be further substituted (for example, with an alkoxy group). Examples of the alkoxy group (including substituted alkoxy groups) are methoxy, ethoxy, butoxy and methoxyethoxy groups.

Preferably, the alkoxycarbonyl group has from 2 to 10 carbon atoms. Examples of the alkoxycarbonyl group include methoxycarbonyl and ethoxycarbonyl groups.

Preferably, the alkoxycarbonylamino group has from 2 to 10 carbon atoms. Examples of the alkoxycarbonylamino group include methoxycarbonylamino and ethoxycarbonylamino groups.

Preferably, the alkylthio group has from 1 to 12 carbon atoms. Examples of the alkylthio group include methylthio, ethylthio and octylthio groups.

Preferably, the alkylsulfonyl group has from 1 to 8 carbon atoms. Examples of the alkylsulfonyl group include methanesulfonyl and ethanesulfonyl groups.

Preferably, the aliphatic amido group has from 1 to 10 carbon atoms. One example of the aliphatic amido group is an acetamido group.

Preferably, the aliphatic sulfonamido group has from 1 to 8 carbon atoms. Examples of the aliphatic sulfonamido group include methanesulfonamido, butanesulfonamido and n-octanesulfonamido groups.

Preferably, the aliphatic substituted amino group has from 1 to 10 carbon atoms. Examples of the aliphatic substituted amino group include dimethylamino, diethylamino and 2-carboxyethylamino group.

Preferably, the aliphatic substituted carbamoyl group has from 2 to 10 carbon atoms. Examples of the aliphatic substituted carbamoyl group include methylcarbamoyl and diethylcarbamoyl groups.

Preferably, the aliphatic substituted sulfamoyl group has from 1 to 8 carbon atoms. Examples of the aliphatic substituted sulfamoyl group include methylsulfamoyl and diethylsulfamoyl groups.

Preferably, the aliphatic substituted ureido group has from 2 to 10 carbon atoms. One example of the aliphatic substituted ureido group us a methylureido group.

Examples of the non-aromatic heterocyclic group include piperidino and morpholino groups.

Preferably, the molecular weight of the retardation-controlling agent falls between 300 and 800. Specific examples of such tabular retardation-controlling agents are described, for example, in International Patent Laid-Open No. WO 00/65384.

(β) Rod Compounds:

In the invention, rod compounds having a maximum absorption in a short wavelength range shorter than 250 nm are also preferred for the retardation-controlling agent.

In view of their function as the retardation-controlling agent, the rod compounds for use herein preferably have at least one aromatic ring, more preferably at least two aromatic rings each.

Also preferably, the rod compounds have a linear molecular structure. The linear molecular structure is meant to indicate that the molecular structure of the rod compound is linear when it is the most stable in point of its thermodynamic aspect. The structure of the compound that is the most stable in point of its thermodynamic aspect can be determined through crystal structure analysis or molecular orbital computation. For example, using a molecular orbital computation software (e.g., WinMOPAC2000 from Fujitsu), the compound is analyzed through molecular orbital computation, and its molecular structure with which the heat of forming the compound is the smallest is determined. The linear molecular structure is meant to indicate that the angle of the molecular structure that has been found to be the most stable in point of its thermodynamic aspect through the computation as above is at least 140 degrees.

For the rod compounds for use herein, preferred are those of the following formula (I):

$$Ar^1\text{-}L^1\text{-}Ar^2 \tag{I}$$

In formula (I), $Ar^1$ and $Ar^2$ each independently represent an aromatic group.

In the present description, the aromatic group includes an aryl group (aromatic hydrocarbon group), a substituted aryl group, an aromatic heterocyclic group and a substituted aromatic heterocyclic group.

For it, aryl and substituted aryl groups are preferred to aromatic heterocyclic and substituted aromatic heterocyclic groups. The hetero-ring in the aromatic heterocyclic group is generally unsaturated. Preferably, the aromatic hetero-ring is a 5-membered, 6-membered or 7-membered ring, more preferably a 5-membered or 6-membered ring. The aromatic hetero-ring generally has a largest number of double bonds. For the heteroatom in the ring, preferred is any of nitrogen, oxygen or sulfur atom, and more preferred is nitrogen or sulfur atom. Examples of the aromatic hetero-rings include furan, thiophene, pyrrole, oxazole, isoxazole, thiazole, isothiazole, imidazole, pyrazole, furazane, triazole, pyran, pyridine, pyridazine, pyrimidine, pyrazine and 1,3,5-triazine rings.

Preferred examples of the aromatic ring for the aromatic group are benzene, furan, thiophene, pyrrole, oxazole, thiazole, imidazole, triazole, pyridine, pyrimidine and pyrazine rings; and more preferred for it is a benzene ring.

Examples of the substituents for the substituted aryl group and the substituted aromatic heterocyclic group include a halogen atom (F, Cl, Br, I), a hydroxyl group, a carboxyl group, a cyano group, an amino group, an alkylamino group (e.g., methylamino, ethylamino, butylamino, dimethylamino), a nitro group, a sulfo group, a carbamoyl group, an alkylcarbamoyl group (e.g., N-methylcarbamoyl, N-ethylcarbamoyl, N,N-dimethylcarbamoyl), a sulfamoyl group, an alkylsulfamoyl group (e.g., N-methylsulfamoyl, N-ethylsulfamoyl, N,N-dimethylsulfamoyl), an ureido group, an alkylureido group (e.g., N-methylureido, N,N-dimethylureido, N,N,N'-trimethylureido), an alkyl group (e.g., methyl, ethyl, propyl, butyl, pentyl, heptyl, octyl, isopropyl, s-butyl, t-amyl, cyclohexyl, cyclopentyl), an alkenyl group (e.g., vinyl, allyl, hexenyl), an alkynyl group (e.g., ethynyl, butynyl), an acyl group (e.g., formyl, acetyl, butyryl, hexanoyl, lauryl), an acyloxy group (e.g., acetoxy, butyryloxy, hexanoyloxy, lauryloxy), an alkoxy group (e.g., methoxy, ethoxy, propoxy, butoxy, pentyloxy, heptyloxy, octyloxy), an aryloxy group (e.g., phenoxy), an alkoxycarbonyl (e.g., methoxycarbonyl, ethoxycarbonyl, propoxycarbonyl, butoxycarbonyl, pentyloxycarbonyl, heptyloxycarbonyl), an aryloxycarbonyl group (e.g., phenoxycarbonyl), an alkoxycarbonylamino group (e.g., butoxycarbonylamino, hexyloxycarbonylamino), an alkylthio group (e.g., methylthio, ethylthio, propylthio, butylthio, pentylthio, heptylthio, octylthio), an arylthio group (e.g., phenylthio), an alkylsulfonyl group (e.g., methylsulfonyl, ethylsulfonyl, propylsulfonyl, butylsulfonyl, pentylsulfonyl, heptylsulfonyl, octylsulfonyl), an amido group (e.g., acetamido, butylamido, hexylamido, laurylamido), and a non-aromatic heterocyclic group (e.g., morpholyl, pyrazinyl).

For the substituents for the substituted aryl group and the substituted aromatic heterocyclic group, preferred are a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group and an alkyl group.

The alkyl moiety in the alkylamino group, the alkoxycarbonyl group, the alkoxy group and the alkylthio group, and also the alkyl group may be further substituted. Examples of the substituents for the alkyl moiety and the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, an ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. For the substituents for the alkyl moiety and the alkyl group, preferred are a halogen atom, a hydroxyl group, an amino group, an alkylamino group, an acyl group, an acyloxy group, an acylamino group, an alkoxycarbonyl group and an alkoxy group.

In formula (I), $L^1$ represents a divalent linking group selected from an alkylene group, an alkenylene group, an alkynylene group, —O—, —CO— and their combinations.

The alkylene group may have a cyclic structure. The cyclic alkylene group is preferably a cyclohexylene group, more preferably a 1,4-cyclohexylene group. For the acyclic alkylene group, a linear alkylene group is preferred to a branched alkylene group.

Preferably, the alkylene group has from 1 to 20 carbon atoms, more preferably from 1 to 15 carbon atoms, even more preferably from 1 to 10 carbon atoms, still more preferably from 1 to 8 carbon atoms, most preferably from 1 to 6 carbon atoms.

Preferably, the alkenylene group and the alkynylene group have an acyclic structure but not a cyclic structure. More preferably, they have a linear structure but not a branched structure.

Also preferably, the alkenylene group and the alkynylene group have from 2 to 10 carbon atoms, more preferably from 2 to 8 carbon atoms, even more preferably from 2 to 6 carbon atoms, still more preferably from 2 to 4 carbon atoms each. Most preferred is a 2-vinylene (or ethynylene) group.

Examples of the combined, divalent linking groups are mentioned below.

L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—

In the molecular structure of formula (I), it is desirable that the angle at which $Ar^1$ meets $Ar^2$ via $L^1$ therebetween is at least 140 degrees.

More preferably, the rod compounds for use herein are those of the following formula (II):

$$Ar^1\text{-}L^2\text{-}X\text{-}L^3\text{-}Ar^2 \qquad (II)$$

In formula (II), $Ar^1$ and $Ar^2$ each independently represent an aromatic group. The definition and the examples of the aromatic group are the same as those mentioned hereinabove for $Ar^1$ and $Ar^2$ in formula (I).

In formula (II), $L^2$ and $L^3$ each independently represent a divalent linking group selected from an alkylene group, —O—, —CO—, and their combinations.

Preferably, the alkenylene group has an acyclic structure but not a cyclic structure. More preferably, it has a linear structure but not a branched structure.

Also preferably, the alkenylene group has from 1 to 10 carbon atoms, more preferably from 1 to 8 carbon atoms, even more preferably from 1 to 6 carbon atoms, still more preferably from 1 to 4 carbon atoms, most preferably 1 or 2 carbon atoms (methylene or ethylene).

Especially preferably, $L^2$ and $L^3$ each are —O—CO— or —CO—O—.

In formula (II), X represents a 1,4-cyclohexylene, vinylene or ethynylene group.

Specific examples of the compounds of formula (I) are mentioned below.

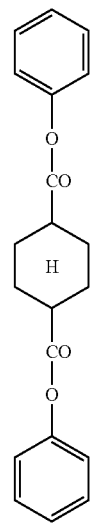

(1)

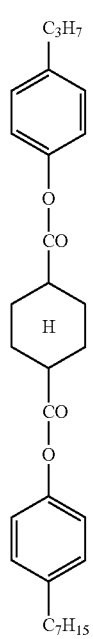
(2)
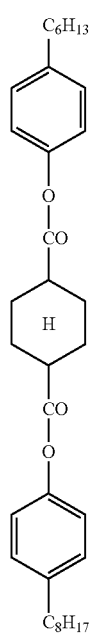
(3)
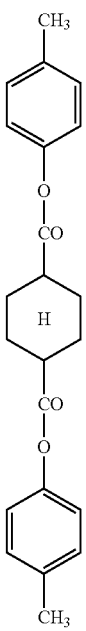
(4)
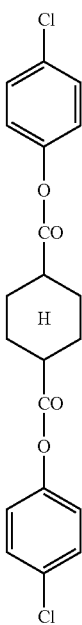
(5)

-continued
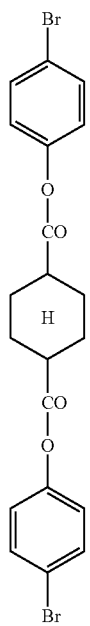
(6)
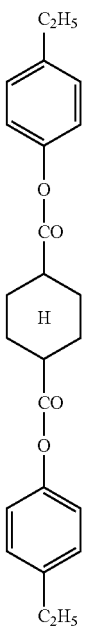
(7)
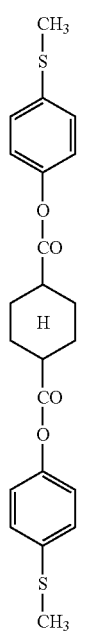
-continued
(8)
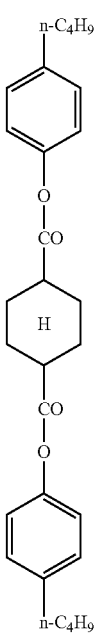
(9)

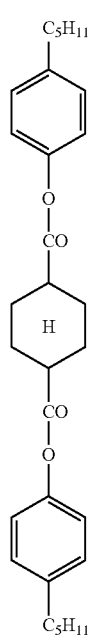
(10)
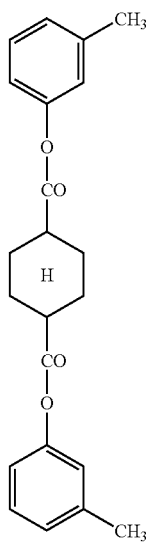
(12)
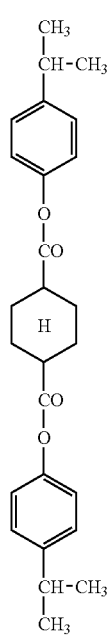
(11)
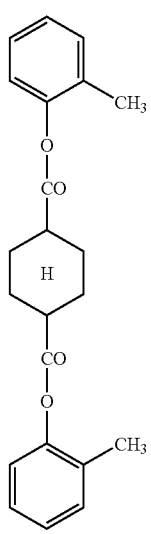
(13)

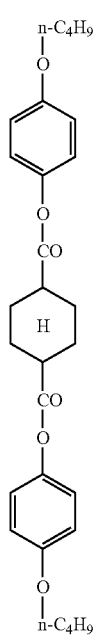
(14)
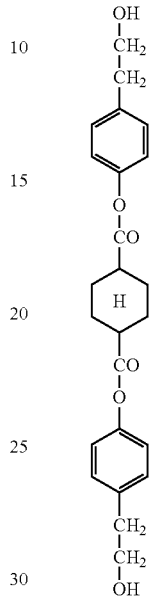
(16)
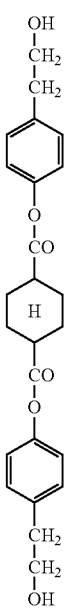
(15)
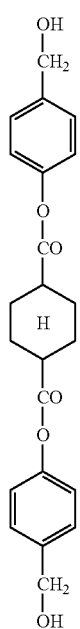
(17)
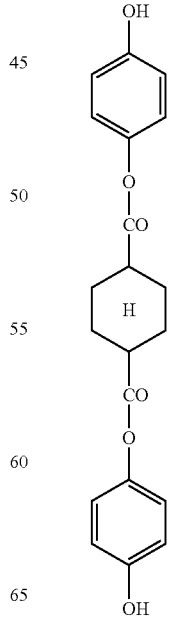

(18)
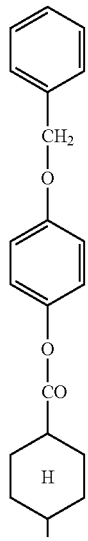
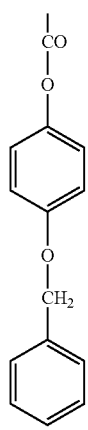
(19)
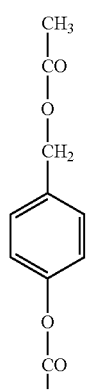
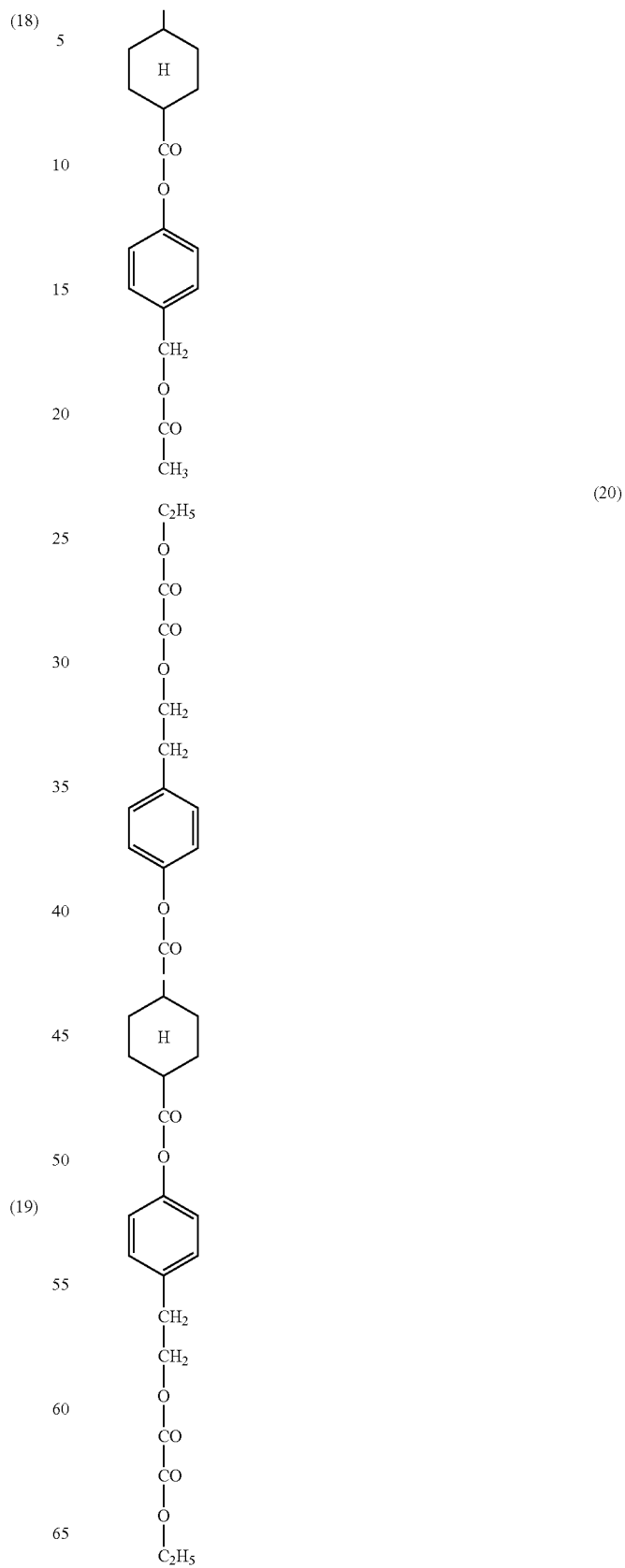

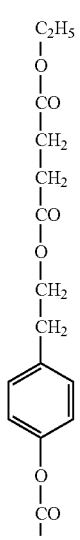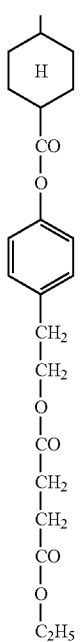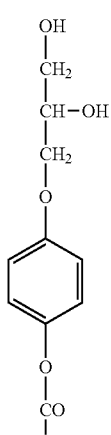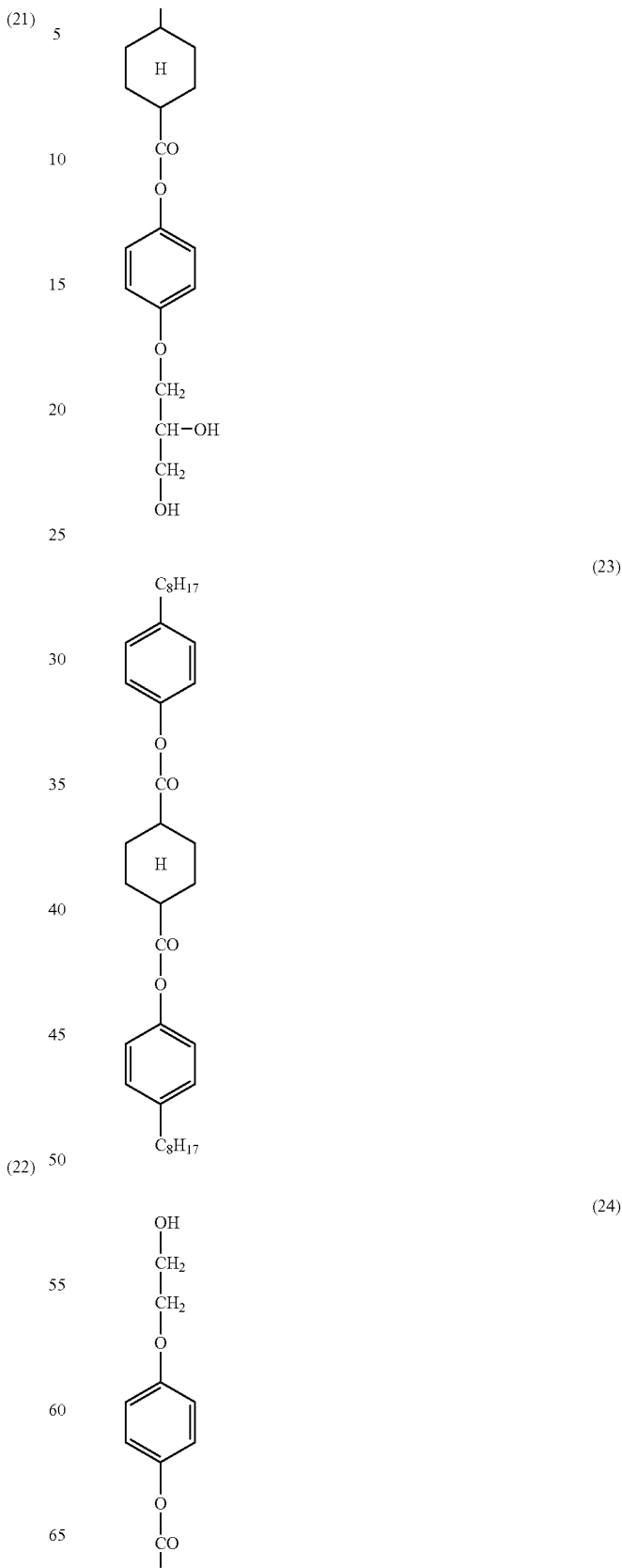

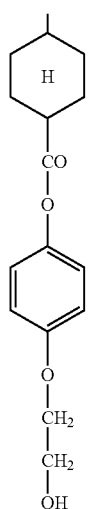
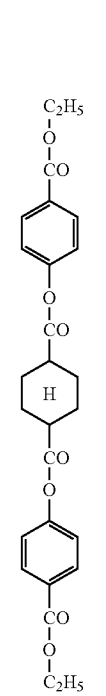
(26)
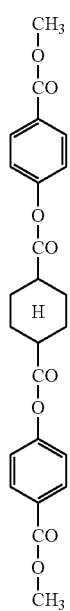
(25)
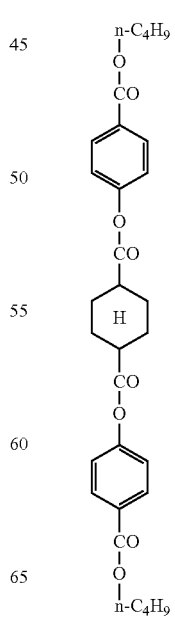
(27)

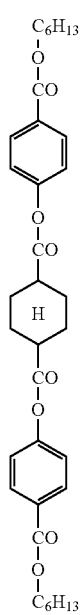
(28)
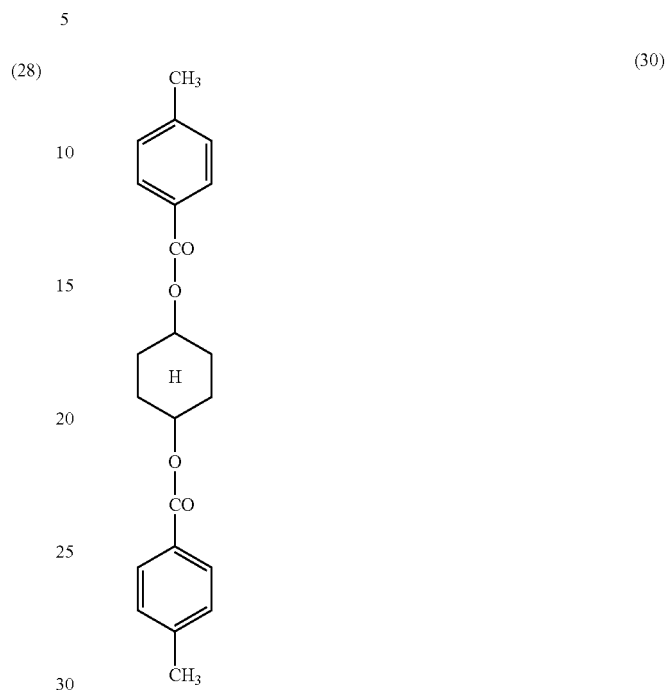
(30)
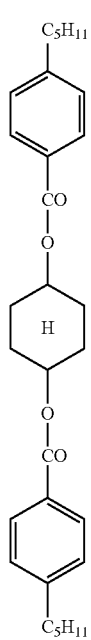
(29)
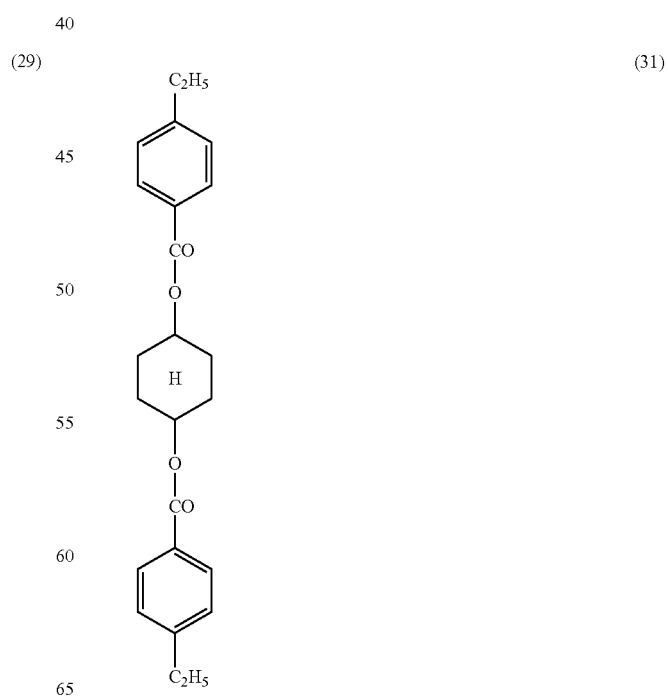
(31)

-continued
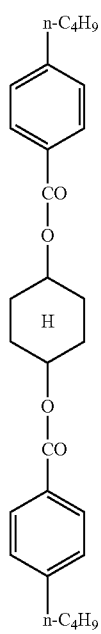
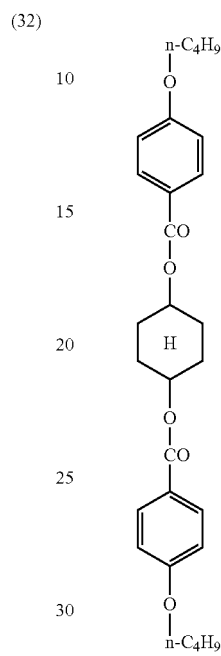
(32)
(34)
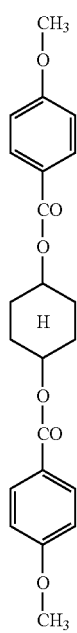
(33)
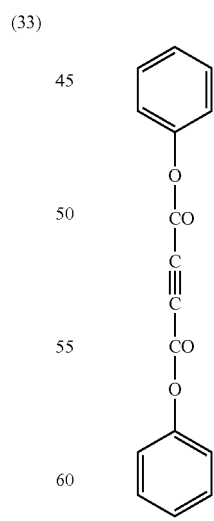
(35)

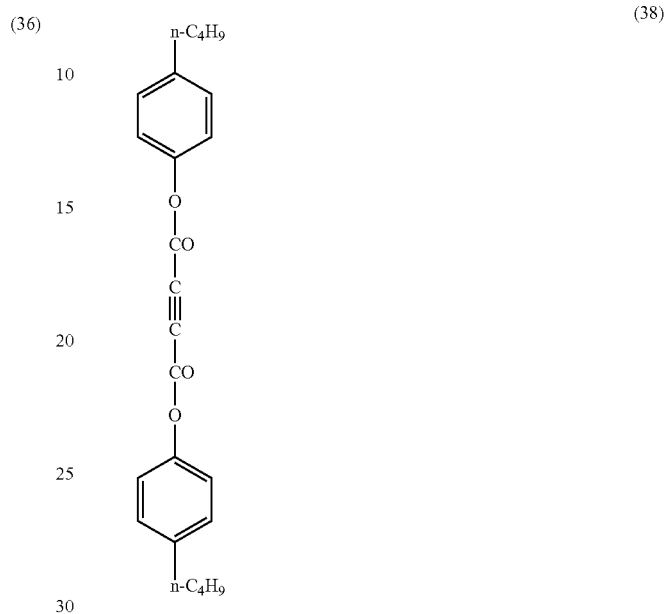
(36)
(37)
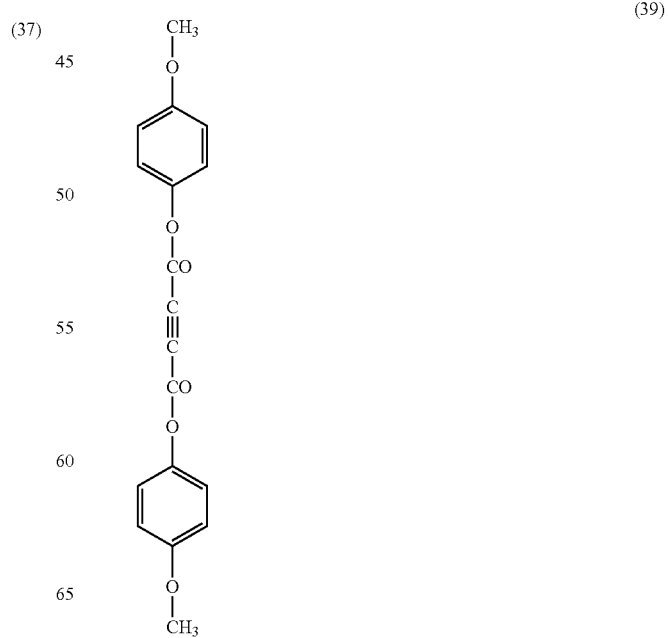
(38)
(39)

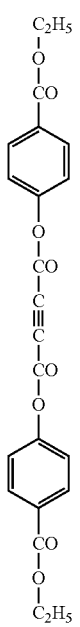
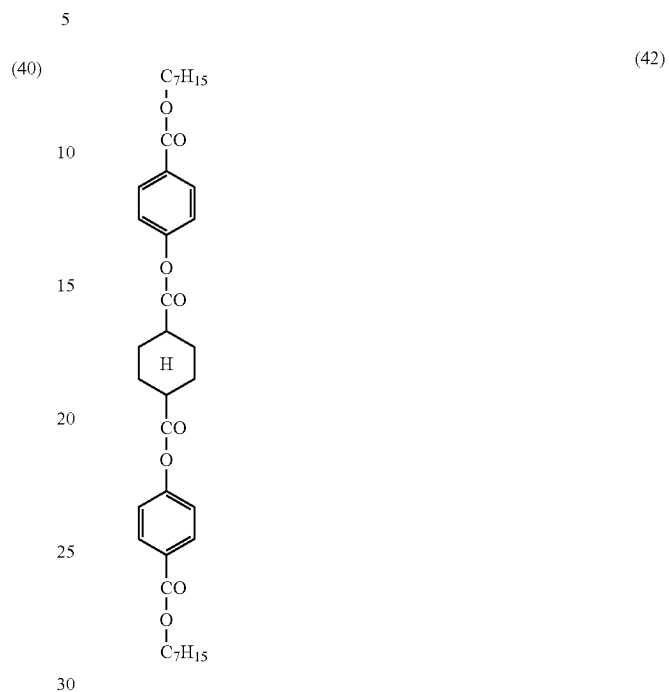
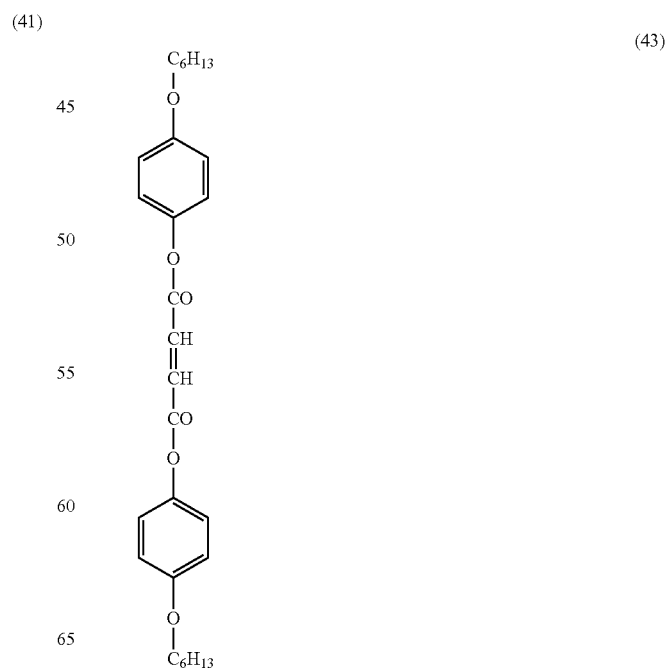

-continued

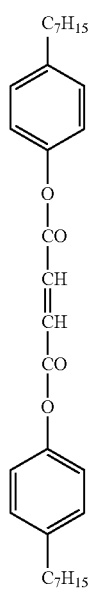

(44)

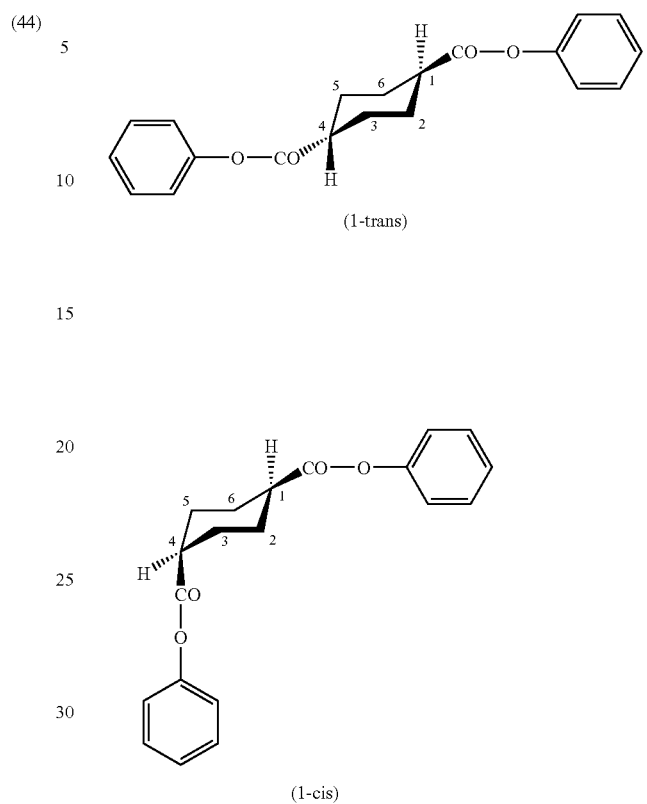

(45)

Compounds (1) to (34), (41) and (42) each have two asymmetric carbon atoms at the 1- and 4-positions of the cyclohexane ring therein. However, since compounds (1), (4) to (34), (41) and (42) have a symmetric meso-type molecular structure, they do not include optical isomers (with optical activity) but have only geometric isomers (trans- and cis-isomers). 1-trans and 1-cis structures of compound (1) are shown below.

As so mentioned hereinabove, the rod compounds for use herein preferably have a linear molecular structure. Accordingly, trans-isomers are preferred to cis-isomers of the compounds.

Compounds (2) and (3) have both geometric isomers and optical isomers (totaling four isomers). Of the geometric isomers thereof, trans-isomers are preferred to cis-isomers. However, there is no specific difference between the optical isomers of the compounds in point of their superiority. The optical isomers may be any of D- or L-isomers or even racemates.

In compounds (43) to (45), the center vinylene bond includes trans-and cis-structures. For the same reason as above, trans-structures are also preferred to cis-structures of these compounds.

Two or more different types of such rod compounds of which the maximum absorption wavelength (λmax) is shorter than 250 nm in solution UV absorptiometry may be combined and used in the invention.

The rod compounds may be produced with reference to the methods described in literature. The literature disclosing the methods includes, for example, *Mol. Cryst. Liq. Cryst.*, Vol. 53, p. 229 (1979); ibid., Vol. 89, p. 93 (1982); ibid., Vol. 145, p. 111 (1987); ibid., Vol. 170, p. 43 (1989); *J. Am. Chem. Soc.*, Vol. 113, p. 1349 (1991); ibid., Vol. 118, p. 5346 (1886); ibid., Vol. 92, p. 1582 (1970); *J. Org. Chem.*, Vol. 40, p. 420 (1875); *Tetrahedron*, Vol. 48, No. 16, p. 3437 (1992).

(Spectrometry of Retardation-Controlling Compounds)

The UV and visible range (UV-vis) spectrum of the above-mentioned retardation-controlling agent (10-trans) was measured. Concretely, the retardation-controlling agent (10-trans) was dissolved in tetrahydrofuran (not containing a stabilizer, BHT (butylated hydroxytoluene)) to prepare its solution having a concentration of $10^{-5}$ mol/dm$^3$. The resulting solution was measured with a spectrophotometer (from Hitachi), and the wavelength at which the solution showed a maximum absorption ($\lambda$max) was 220 nm. The absorption coefficient ($\epsilon$) of the compound solution was 15000. In the same manner as above, the retardation-controlling agent (29-trans) was analyzed, and the wavelength at which the compound solution showed a maximum absorption ($\lambda$max) was 240 nm. The absorption coefficient ($\epsilon$) of the compound solution was 20000. Also in the same manner, the retardation-controlling agent (41-trans) was analyzed, and the wavelength at which the compound solution showed a maximum absorption ($\lambda$max) was 230 nm. The absorption coefficient ($\epsilon$) of the compound solution was 16000.

One or more retardation-controlling compounds may be used in the invention, either singly or as combined.

[Production of Cellulose Acetate Film]

The cellulose acetate film for use in the invention is preferably produced in a solvent-casting method. In the solvent-casting method, the polymer material for the film is dissolved in an organic solvent and the resulting solution (dope) is cast to form the intended polymer film.

One example of the method of producing the cellulose acetate film of the invention is described concretely, using cellulose acetate.

The organic solvent is preferably selected from ethers having from 3 to 12 carbon atoms, ketones having from 3 to 12 carbon atoms, esters having from 3 to 12 carbon atoms, and halogenohydrocarbons having from 1 to 6 carbon atoms.

These ethers, ketones and esters may have a cyclic structure. Compounds having at least two functional groups of ethers, ketones and esters (i.e., —O—, —CO— and —COO—) may also be used for the organic solvent. The organic solvent for use herein may have any other functional group such as an alcoholic hydroxyl group. The number of carbon atoms that constitute the organic solvent having two or more functional groups shall fall within the defined range of the compounds having any one of the functional groups.

Examples of the ethers having from 3 to 12 carbon atoms include diisopropyl ether, dimethoxymethane, dimethoxyethane, 1,4-dioxane, 1,3-dioxolane, tetrahydrofuran, anisole and phenetole.

Examples of the ketones having from 3 to 12 carbon atoms include acetone, methyl ethyl ketone, diethyl ketone, diisobutyl ketone, cyclohexanone and methylcyclohexanone.

Examples of the esters having from 3 to 12 carbon atoms include ethyl formate, propyl formate, pentyl formate, methyl acetate, ethyl acetate and pentyl acetate.

Examples of the organic solvent having two or more functional groups include 2-ethoxyethyl acetate, 2-methoxyethanol and 2-butoxyethanol.

Preferably, the halogenohydrocarbons for the organic solvent have 1 or 2 carbon atoms, most preferably one carbon atom. The halogen in the halogenohydrocarbons is preferably chlorine. Preferably, the degree of hydrogen substitution with halogen in the halogenohydrocarbons falls between 25 and 75 mol %, more preferably between 30 and 70 mol %, even more preferably between 35 and 65 mol %, most preferably between 40 and 60 mol %. One typical example of the halogenohydrocarbons is methylene chloride.

Two or more different organic solvents may be mixed and used herein.

A cellulose acetate solution may be prepared in any ordinary manner. The ordinary manner is meant to indicate that the solution is prepared at a temperature not lower than 0° C. (room temperature or high temperature). For preparing the solution, employable are any known method and device that are generally used in preparing dopes in an ordinary solvent-casting method. In the ordinary method, a halogenohydrocarbon (especially methylene chloride) is preferably used for the organic solvent.

The amount of cellulose acetate to be dissolved in the organic solvent is so controlled that the resulting solution has a cellulose acetate content of from 10 to 40% by weight. More preferably, the cellulose acetate content of the solution falls between 10 and 30% by weight. Any optional additive that will be mentioned hereinunder may be added to the organic solvent (main solvent).

The intended solution may be prepared by stirring cellulose acetate in the organic solvent at room temperature (0 to 40° C.). The solution of high concentration may be stirred under heat and pressure. Concretely, cellulose acetate and the organic solvent are put into a pressure vessel and sealed up therein, and these are stirred under pressure while heated at a temperature not lower than the boiling point at room temperature of the solvent but at which the solvent does not boil. The heating temperature is generally 40° C. or higher, preferably falling between 60 and 200° C., more preferably between 80 and 110° C.

The individual components may be put into the vessel after they are roughly pre-mixed. Alternatively, they may be put thereinto one after another. The vessel must be so constituted that it allows the contents to be stirred therein. An inert vapor such as nitrogen gas may be introduced into the vessel to increase the pressure in the vessel. For the pressure increase, the increased vapor pressure of the heated solvent may also be utilized. As the case may be, after the vessel is sealed up, the components may be forced thereinto under pressure.

Preferably, the vessel with the components therein is heated by an external heating unit. For it, for example, usable is a jacket heater. Alternatively, a plate heater may be provided outside the vessel, and a liquid is circulated therein so as to entirely heat the vessel.

Preferably, a stirring blade is disposed inside the vessel, with which the contents of the vessel may be stirred. It is desirable that the stirring blade is so long as to reach near the inner wall of the vessel. Also preferably, the end edges of the stirring blade are provided with a scraper that serves to renew the liquid film formed on the inner wall of the vessel.

If desired, the vessel may be equipped with some meters such as a pressure gauge and a thermometer. In the vessel, the components are dissolved in the solvent. The dope thus prepared is taken out after it has been cooled in the vessel; or after directly taken out of the vessel, it may be cooled with a heat exchanger or the like.

The solution may also be prepared in a cooling dissolution method. In the cooling dissolution method, cellulose acetate can be dissolved even in an organic solvent in which it is difficult to dissolve in an ordinary dissolving method. For the organic solvent for cellulose acetate, methylene chloride is generally used. However, methylene chloride is not good for global environment protection and for working environment protection, and it is undesirable to use it. In an organic solvent system not containing methylene chloride, cellulose acetate is difficult to dissolve in an ordinary dissolving method. For that system, the cooling dissolution method is effective. Even for other solvents in which cellulose acetate can be dissolved in an ordinary dissolving method, the cooling dissolution method is also effective as it rapidly produces a uniform solution.

In the cooling dissolution method, cellulose acetate is first gradually added to an organic solvent at room temperature with stirring.

Preferably, the amount of cellulose acetate to be added is so controlled that the resulting mixture may contain from 10 to 40% by weight, more preferably from 10 to 30% by weight of cellulose acetate. If desired, any optional additive that will be mentioned hereinunder may be added to the mixture.

Next, the mixture is cooled to a temperature falling between −100° C. and −10° C., preferably between −80° C. and −10° C., more preferably between −50° C. and −20° C., most preferably between −50 and −30° C. Cooling it may be effected, for example, in a dry ice/methanol bath (−75° C.) or in a cooled diethylene glycol solution (from −30 to −20° C.). Thus cooled, the mixture of cellulose acetate and the organic solvent is solidified.

Preferably, the cooling rate is at least 4° C./min, more preferably at least 8° C./min, most preferably at least 12° C./min. Higher cooling rate is better, but the theoretical uppermost limit of the cooling rate is 10000° C./sec, the technical uppermost limit thereof is 1000° C./sec, and the practical uppermost limit thereof is 100° C./sec. The cooling rate is obtained by dividing the difference between the temperature at which the cooling is started and the final cooling temperature by the time taken by the process to reach the final cooling temperature from the start of cooling.

Then, the thus-cooled mixture is heated up to a temperature falling between 0° C. and 200° C., preferably between 0° C. and 150° C., more preferably between 0° C. and 120° C., most preferably between 0° C. and 50° C., through which cellulose acetate dissolves in the organic solvent. Heating the mixture may be effected merely by leaving it at room temperature, or the mixture may be heated in a hot bath.

Preferably, the heating rate is at least 4° C./min, more preferably at least 8° C./min, most preferably at least 12° C./min. Higher heating rate is better, but the theoretical uppermost limit of the heating rate is 10000° C./sec, the technical uppermost limit thereof is 1000° C./sec, and the practical uppermost limit thereof is 100° C./sec. The heating rate is obtained by dividing the difference between the temperature at which the heating is started and the final heating temperature by the time taken by the process to reach the final heating temperature from the start of heating.

A uniform solution of cellulose acetate can be obtained according to the method as above. If cellulose acetate dissolution is still insufficient, the operations of cooling and heating may be repeated. Whether the dissolution is sufficient or not can be judged only by visually observing the external appearance of the solution.

In the cooling dissolution method, it is preferred to use a closed vessel so that water from dew formation in cooling the mixture does not enter the mixture. In the cooling and heating process, pressure application during cooling and pressure reduction during heating result in the reduction in the period of time taken for dissolution. For pressure application and pressure reduction, preferred is a pressure vessel.

It has been confirmed through differential scanning calorimetry (DSC) that the 20 wt. % solution obtained by dissolving cellulose acetate (degree of acetylation: 60.9%, viscosity-average degree of polymerization: 299) in methyl acetate in the cooling dissolution method has a pseudo phase transition point of around 33° C. at which it undergoes sol-gel change. At a temperature lower than the pseudo phase transition point, the solution forms a uniform gel. Accordingly, the solution must be kept at a temperature not lower than the pseudo phase transition point, preferably at a temperature higher than the pseudo phase transition point by about 10° C. However, the pseudo phase transition point of the solution varies depending upon the degree of acetylation and the viscosity-average degree of polymerization of cellulose acetate in the solution, and on the solution concentration and the organic solvent used.

A cellulose acetate film is formed from the thus-prepared cellulose acetate solution (dope) in a solvent casting method.

A film is formed by casting the dope on a drum or a band and evaporating the solvent from it. Preferably, the dope to be cast is so controlled that its solid content falls between 18 and 35% by weight. The surface of the drum or the band is preferably finished to have a mirror surface. The methods of casting and drying the film in the solvent casting method are disclosed in U.S. Pat. Nos. 2,336,310, 2,367,603, 2,492,078, 2,492,977, 2,492,978, 2,607,704, 2,739,069, 2,739,070; British Patents 640,731, 736,892; JP-B 4554/1970, 5614/1974; JP-A 176834/1985, 203430/1985, 115035/1987.

It is preferred to cast the dope on a drum or a band having a surface temperature not higher than 10° C. It is also preferred to dry the cast dope by applying thereto wind for at least 2 seconds. The formed film may be peeled from the drum or the band and may be further dried by applying thereto high-temperature wind that gradually varies from 100 to 160° C. to thereby evaporate away the remaining solvent. This method is disclosed in JP-B 17844/1993. According to these methods, the time to be taken from casting the solution to peeling off the film can be reduced. In this method, it is necessary that the dope should gel at the surface temperature of the drum or the band on which it is cast.

One or more films may be formed by casting the cellulose acetate solution (dope) prepared in the above, according to the solvent casting method. For this, the dope is cast on a drum or a band, and the solvent is evaporated away to form the intended film. Before cast, the dope is preferably so controlled that its solid content falls between 10 and 40%. Also preferably, the surface of the drum or the band is mirror-finished.

In case where at least two cellulose acetate solutions for at least two films are cast, the cellulose acetate solutions are cast on a support through the respective casting mouths that are provided at intervals in the machine direction of the support to thereby laminate the resulting films on the support. For this, for example, herein employable are the methods described in JP-A 158414/1986, 122419/1989, 198285/1999. The cellulose acetate solution may be cast through two casting mouths to form the film. For this, for example, herein employable are the methods described in JP-B 27562/1985; JP-A 94724/1986, 94725/1986, 104813/1986, 158413/1986, 134933/1994. A part from these, the casting method described in JP-A 162617/1981 is also employable herein, in which the flow of a high-viscosity cellulose acetate solution is enveloped in a low-viscosity cellulose acetate solution and the two, high-viscosity and low-viscosity cellulose acetate solutions are co-extruded out to form a cellulose acetate film.

Alternatively, two casting mouths may be used for film formation in such a manner that the film formed on a support through the first casting mouth is peeled off and another film is formed through the second casting mouth on the thus-peeled film on its surface that was contacted with the support, for example as in JP-B 20235/1969.

The same or different cellulose acetate solutions may be cast in film formation with no specific limitation. To make the formed multiple cellulose acetate films have the respective functions, the cellulose acetate solutions capable of giving the intended functions to the films shall be extruded out through the respective casting mouths.

If desired, the cellulose acetate solution may be co-cast along with any other solutions for other functional layers (e.g., adhesive layer, colorant layer, antistatic layer, antihalation layer, UV-absorbent layer, polarizing layer) to form a laminate film.

In forming a single-layered film, it is necessary to extrude a high-concentration and high-viscosity cellulose acetate solution in order that the film formed may have a desired thickness. In that case, however, the cellulose acetate solution is not stable and often forms a solid. This is problematic in that the solid causes fish eyes in the film formed, and the surface of the film is not smooth. To solve the problem, multiple cellulose acetate solutions are cast through a casting mouth, and the resulting high-viscosity cellulose acetate solution is extruded onto a support to give a smooth and good film. Another advantage is that the high-viscosity cellulose acetate solution reduces the load of drying the film formed of it and its film-producing speed increases.

A plasticizer may be added to the cellulose acetate film for improving the mechanical properties of the film and for rapidly drying the film. For the plasticizer, usable are phosphates or carboxylates. Examples of the phosphates include triphenyl phosphate (TPP), biphenyldiphenyl phosphate (BDP) and tricresyl phosphate (TCP). The carboxylates are typically phthalates and citrates. Examples of the phthalates include dimethyl phthalate (DMP), diethyl phthalate (EDP), dibutyl phthalate (DBP), dioctyl phthalate (DOP), diphenyl phthalate (DPP) and diethylhexyl phthalate (DEHP). Examples of the citrates include triethyl o-acetylcitrate (OACTE) and tributyl o-acetylcitrate (OACTB). Examples of other carboxylates include butyl oleate, methylacetyl ricinoleate, dibutyl sebacate, and various trimellitates. Phthalate plasticizers (DMP, DEP, DBP, DOP, DPP, DEHP) are preferred for use herein. More preferred are DEP and DPP.

The amount of the plasticizer that may be added to the film preferably falls between 0.1 and 25% by weight of cellulose acetate, more preferably between 1 and 20% by weight, most preferably between 3 and 15% by weight.

Also if desired, an anti-aging agent (e.g., antioxidant, peroxide-degrading agent, radical inhibitor, metal inactivator, acid scavenger, amine) may be added to the cellulose acetate film. Such anti-aging agents are described in JP-A199201/1991, 197073/1993, 194789/1993, 271471/1993, 107854/1994. The amount of the anti-aging agent that may be added to the film preferably falls between 0.01 and 1% by weight of the film-forming solution (dope), more preferably between 0.01 and 0.2% by weight. If its amount is smaller than 0.01% by weight, the anti-aging agent will be almost ineffective. However, if its amount is larger than 1% by weight, the anti-aging agent will bleed out of the film surface. Especially preferred examples of the anti-aging agent for use herein are butylated hydroxytoluene (BHT) and tribenzylamine (TBA).

One or both surfaces of the cellulose acetate film may be coated with a mat layer that comprises a matting agent and a polymer, for improving the handlability of the film being produced. For the matting agent and the polymer, preferred are the materials described in JP-A 44327/1998. If desired, the matting agent may be added to the dope.

Many other additives may also be added to the cellulose acetate solution, if desired, in any stage before or after or during its preparation. The additives include, for example, UV absorbents; fine inorganic particles of, for example, silica, kaolin, talc, diatomaceous earth, quartz, calcium carbonate, barium sulfate, titanium oxide or alumina; thermal stabilizers such as alkaline earth metal salts with, for example, calcium or magnesium; other antistatic agents, flame retardants, lubricants, and oils.

Also if desired, a release promoter may be added to the film for reducing the load necessary in peeling the film. For it, for example, surfactants are effective, including, for example, phosphates, sulfonates, carboxylates, nonionic surfactants and cationic surfactants, to which, however, the release promoter usable herein is not limited. These are described, for example, in JP-A 243837/1986.

[Surface Treatment of Cellulose Acetate Film]

The cellulose acetate film may undergo surface treatment. Concretely, for it, the film is subjected to corona discharge treatment, glow discharge treatment, flame treatment, acid treatment, alkali treatment or UV irradiation.

For ensuring the surface smoothness of the cellulose acetate film that undergoes such surface treatment, it is desirable that the temperature at which the film receives the treatment is not higher than the glass transition point (Tg) of the film.

In case where the film is used for a transparent protective film of polarizing plates, it is especially desirable that the film receives acid or alkali treatment for increasing its adhesiveness to the polarizing film of the plates. More preferably, the film receives alkali treatment.

One preferred cycle of alkali treatment of the film comprises dipping the film in an alkali solution, then neutralizing it in an acid solution, rinsing it in water, and drying it.

The alkali solution may be a potassium hydroxide solution or a sodium hydroxide solution. Of the solution, the hydroxide ion normality concentration preferably falls between 0.1 N and 3.0 N, more preferably between 0.5 N and 2.0 N. Preferably, the temperature of the alkali solution falls between room temperature and 90° C., more preferably between 40° C. and 70° C. The alkali solution may be an aqueous solution or a solution in an organic solvent. For the latter, the organic solvent is preferably a lower alcohol, more preferably an alcohol having from 1 to 5 carbon atoms or a glycol, even more preferably ethanol, n-propanol, iso-propanol, butanol, ethylene glycol or propylene glycol. Still more preferred are iso-propanol and propylene glycol. If desired, these may be mixed for use herein. In addition, water or surfactant may be added to the solvent.

Some preferred examples of the solvent in which alkali is dissolved to be an alkali solution are mentioned below.
iso-propanol/propylene glycol/water (70/15/15, by volume)
iso-propanol/water (85/15, by volume)
iso-propanol/propylene glycol (85/15, by volume)
iso-propanol alone The film may be dipped in the alkali solution, or may be coated with it (for example, through bar coating or curtain coating).

In the invention, for improving the adhesiveness of the cellulose acetate film to the layer that overlies it (e.g., adhesive layer, orientation film, optical anisotropic layer), an adhesive layer (subbing layer) may be provided on the film, for example, as in JP-A 333433/1995. Preferably, the thickness of the adhesive layer falls between 0.1 μm and 2 μm, more preferably between 0.2 μm and 1 μm.

[Polarizing Plate]

A polarizing plate comprises a polarizing film and two transparent protective films provided on both surfaces of the polarizing film. In this, one protective film may be the cellulose acetate film mentioned above or may be the optical compensating film of the invention. The other protective film may be an ordinary cellulose acetate film; or both the protective films may be ordinary cellulose acetate films.

The polarizing film is, for example, an iodine-containing polarizing film, a dichromatic dye-containing polarizing film, or a polyene polarizing film. For producing the iodine-containing polarizing film and the dye-containing polarizing film, generally used are polyvinyl alcohol films.

The polymer films for these polarizing films are prepared, for example, as follows: Using a tenter-type stretching machine, a polymer film is stretched under the condition that satisfies the following requirement (1) while it keeps its self-sustainability and while its volatile content is still at least 5%, and after thus stretched, the film is then shrunk to reduce its volatile content.

$$|L2-L1|>0.4W \tag{1}$$

wherein L1 indicates the trajectory of the film holder from the substantial holding start point of one edge of the film to the substantial holding release point thereof; L2 indicates the trajectory of the film holder from the substantial holding start point of the other edge of the film to the substantial holding release point thereof; and W indicates the distance between the two substantial holding release points.

Figure 7:
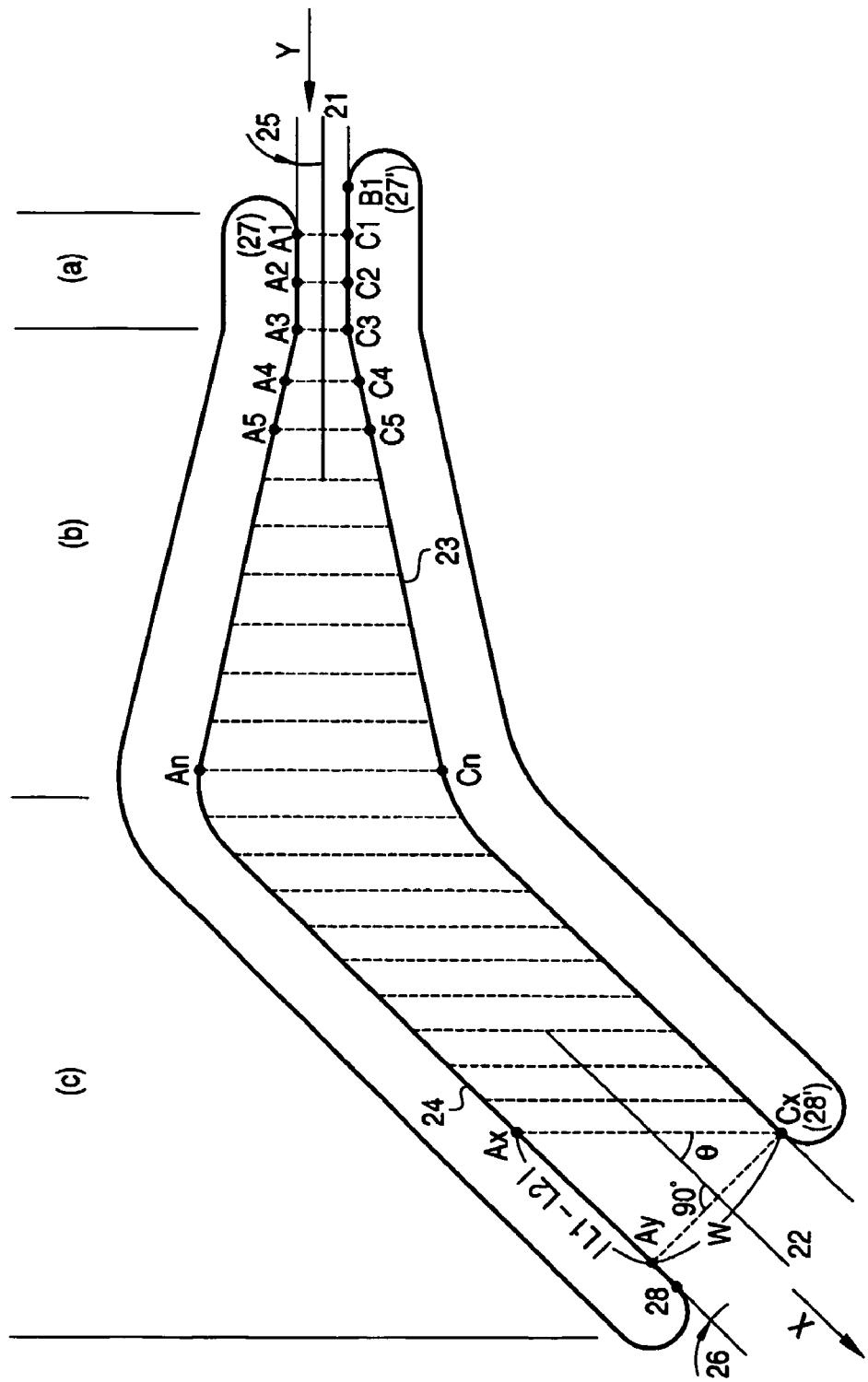
FIG. 7 is a schematic plan view showing an obliquely stretching device that is used in Example 6.

FIG. 7 is a schematic plan view showing a device for obliquely stretching a polymer film into a polarizing film of 45°-oblique orientation. In this, (a) is a step of introducing an original polymer film 25 in the direction of the arrow (Y); (b) is a step of stretching the film in the transverse direction; and (c) is a step of conveying the thus-stretched film 26 to the subsequent step in the direction of the arrow (X). The film to be oriented is continuously introduced into the device in the direction (Y), and it is first held by the left-side (seen from the upstream side) holder at the point B1 (27'). In this stage, the other edge of the film is not held by the holder, and therefore the film receives no tension in the transverse direction thereof. In other words, the point B1 is not a substantial holding start point. The substantial holding start point is defined as the point at which both edges of the film are held by the holder, and this includes two points A1 (27) and C1, or that is, the downstream holding start point A1 and the point C1 at which a runs approximately perpendicularly to the center line 21 of the traveling film from the point A1 meets the trajectory 23 of the holder on the opposite side. Starting from this point, when the film is conveyed through the holder substantially in such a manner that its both edges run substantially at the same speed, then the point A1 time-dependently moves to A2, A3, . . . An, and the point C1 also time-dependently moves to C2, C3, . . . Cn. In this stage, the traveling film passes through the corresponding points An and Cn that are the bases of the holder at the same time, and the line that connects An to Cn is the orientation direction of the film in which the film is oriented in that stage at An and Cn. As in FIG. 7, the points An are gradually delayed from the points Cn, and the orientation direction is therefore gradually inclined from the direction perpendicular to the machine direction. The substantial holding release point includes two points Cx (28') and Ay, or that is, the upstream point Cx at which the film separates from the holder and the point Ay at which a line that runs approximately perpendicularly to the center line 22 of the traveling film from the point Cx meets the trajectory 24 of the holder on the opposite side. The angle of the final orientation of the thus-stretched film is defined by the ratio of the pathway difference between the right and left sides of the holder at the end point of the stretching process, Ay–Ax (that is, |L2–L2|) to the substantial outlet width, Ay–Cx (that is, W). The tilt angle θ of the film orientation direction to the film-traveling direction is represented by the following:

tan θ=(Ay–Cx)/(Ay–Ax), or that is, tan θ=W/|L1–L2|.

After the point Ay, the upper edge of the film in the drawing is still kept as it is up to 28. However, since the other edge of the film is not held in this condition, the film is no more stretched in the transverse direction thereof and the point 28 is not a substantial holding release point.

As in the above, the substantial holding start point is not a point at which each edge of the film is merely engaged with the corresponding side of the holder, but it includes two points. One is a downstream substantial engaging point, and the other is so defined that the line which connects the two substantial holding start points meets the center line of the traveling film approximately perpendicularly thereto at that point. Similarly, the substantial holding release point includes two. One is an upstream substantial release point, and the other is so defined that the line which connects the two substantial holding release points meets the centerline of the traveling film approximately perpendicularly thereto at that point. The condition that the line meets the center line of the traveling film approximately perpendicularly thereto is meant to indicate that the line that connects the two substantial holding start points or the two substantial holding release points meets the center line of the film at an angle of 90±0.5° therebetween.

In case where the holder in the tenter-type stretching machine is made to have a pathway difference between the right and left sides thereof, the site at which both edges of the traveling film are first held by the holder on both sides thereof, or the site at which both edges of the stretched film are finally released from the holder on both sides thereto to the next stage often have a position error in the machine direction owing to some mechanical limitation, for example, on the rail length of the machine. However, so far as the pathway from the substantial holding start point to the substantial holding release point defined as above satisfies the requirement (1), the film to be stretched in the machine enjoys any desired position tolerance.

The tilt angle of the orientation axis of the stretched film obtained in the above can be controlled, depending on the ratio of the substantial pathway difference between the right and left sides of the holder at the end point of the stretching process, |L1–L2|, to the outlet width, W, in the step (c). Polarizing plates and phase-shift films often require a film of 45°-orientation relative to the machine direction. For orienting a film to have an orientation angle of around 45°, the film stretching parameters preferably satisfy 0.9W<|L1–L2|<1.1W, more preferably 0.97W<|L1–L2|<1.03W.

In reflection or transmission liquid crystal displays, the oriented cellulose acetate film is preferably so disposed that its phase lag axis crosses the transmission axis of the polarizing film therein substantially at an angle of 45 degrees, though depending on the type of the liquid crystal displays.

[Liquid Crystal Display]

The optical compensating film of the cellulose acetate film, and the polarizing plate (circularly polarizing plate)

that comprises the cellulose acetate film are favorable to liquid crystal displays. They apply to any of transmission, reflection or semi-transmission liquid crystal displays, but are more favorable to reflection or semi-transmission liquid crystal displays.

Figure 8:
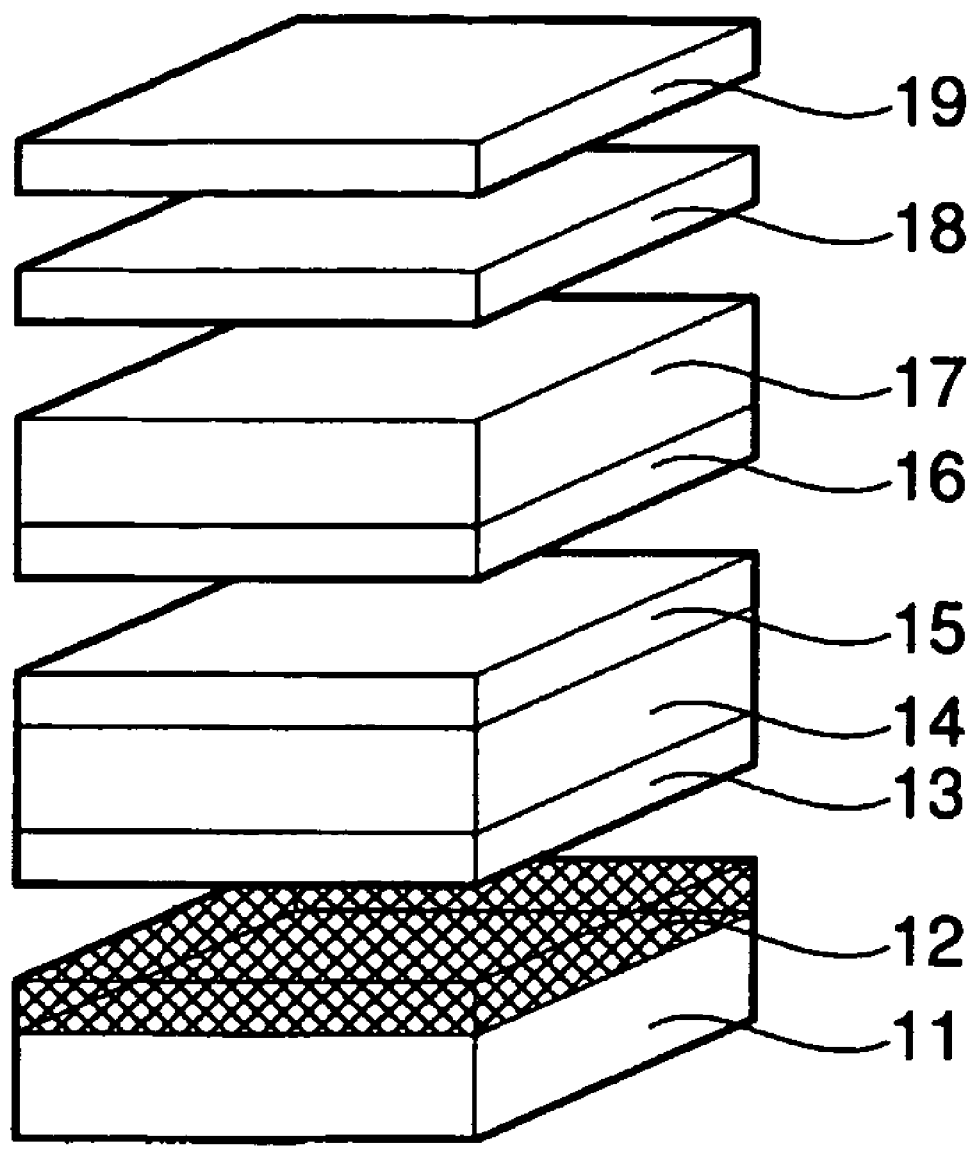
FIG. 8 is a graphic view showing the constitution of the reflection liquid crystal display of the invention.

FIG. 8 is a graphic view showing the basic constitution of the reflection liquid crystal display of the invention.

As in FIG. 8, the reflection liquid crystal display comprises a lower substrate 11, a reflective electrode 12, a lower orientation film 13, a liquid crystal layer 14, an upper orientation film 15, a transparent electrode 16, an upper substrate 17, a λ/4 plate 18 and a polarizing film 19 arrayed in that order from its bottom.

In this, the lower substrate 11 and the reflective electrode 12 constitute a reflector. The lower orientation film 13 to the upper orientation film 15 constitute a liquid crystal cell. The λ/4 plate 18 may be disposed in any site between the reflector and the polarizing film 19.

For displaying color images, the display shall have a color filter layer (not shown). The color filter layer is preferably between the reflective electrode 12 and the lower orientation film 13, or between the upper orientation film 15 and the transparent electrode 16.

In the constitution of FIG. 8, a transparent electrode may be used in place of the reflective electrode 12 and an additional reflector may be disposed therein. For the reflector to be combined with the transparent electrode, preferred is a metal plate. If the reflector is smooth-faced, regular reflective components only are reflected thereon and the field of view is often narrowed. Therefore, it is desirable that the surface of the reflector is roughened (as in Japanese Patent 275,620). In place of roughening the surface of the smooth-faced reflector, a light-diffusive film may be disposed on one side of the polarizing film (on the side adjacent to the cell or on the outer side of the film).

The liquid crystal cell is not specifically defined. For it, any liquid crystal mode is employable with no specific limitation, but preferred are TN (twisted nematic)-mode cells, STN (super twisted nematic)-mode cells, HAN (hybrid aligned nematic)-mode cells, VA (vertically aligned)-mode cells, ECB (electrically controlled birefringence)-mode cells and OCB (optically compensatory bend)-mode cells.

Preferably, the twist angle in TN-mode liquid crystal cells falls between 40 and 100°, more preferably between 50 and 90°, most preferably between 60 and 80°. The product (Δnd) of the refractivity anisotropy (Δn) of the liquid crystal layer and the thickness (d) thereof preferably falls between 0.1 and 0.5 μm, more preferably between 0.2 and 0.4 μm.

The twist angle in STN-mode liquid crystal cells preferably falls between 180 and 360°, more preferably between 220 and 270°. The product (Δnd) of the refractivity anisotropy (Δn) of the liquid crystal layer and the thickness (d) thereof preferably falls between 0.3 and 1.2 μm, more preferably between 0.5 and 1.0 μm.

In HAN-mode liquid crystal cells, it is desirable that the liquid crystal on one substrate is substantially vertically oriented and the pre-tilt angle of the liquid crystal on the other substrate is from 0 to 45°. The product (Δnd) of the refractivity anisotropy (Δn) of the liquid crystal layer and the thickness (d) thereof preferably falls between 0.1 and 1.0 μm, more preferably between 0.3 and 0.8 μm. The substrate on which the liquid crystal is vertically oriented may be on the side of the reflector, or on the side of the transparent electrode.

In VA-mode liquid crystal cells, the rod liquid-crystalline molecules are substantially vertically oriented with no voltage applied thereto. VA-mode liquid crystal cells include (1) those in the narrow sense of the word in which the rod liquid-crystalline molecules are substantially vertically oriented with no voltage applied thereto, but are substantially horizontally oriented with voltage applied thereto (as in JP-A176625/1990, JP-B69536/1995), and (2) those of multi-domain VA-mode that have the advantage of enlarged view angles. Concretely, the VA-mode liquid crystal cells (2) include MVA (SID97, described in *Digest of Tech. Papers* (preliminary), 28, (1997), 845; SID99 in *Digest of Tech. Papers* (preliminary), 30, (1999), 206, and JP-A258605/1999; SURVAILVAL (in *Monthly Display*, Vol. 6, No. 3 (1999), 14); PVA (in *Asia Display* 98, *Proc. of the 18th Inter. Display Res. Conf.* (preliminary) (1998), 383); Para-A (announced in LCD/PDP International '99); DDVA (SID98, in *Digest of Tech. Papers* (preliminary), 29, (1998), 845); EOC (SID98, in *Digest of Tech. Papers* (preliminary), 29, (1998), 313); PSHA (SID98, in *Digest of Tech. Papers* (preliminary), 29, (1998), 1081); RFFMA (in *Asia Display* 98, *Proc. of the 18th Inter. Display Res. Conf.* (preliminary) (1998), 337583); HMD (SID98, in *Digest of Tech. Papers* (preliminary), 29, (2998), 720). Apart from these, VA-mode liquid crystal cells further include (3) those in which the rod liquid-crystalline molecules are substantially vertically oriented with no voltage applied thereto, and are oriented in a mode of twisted multi-domain (n-ASM mode) with voltage applied thereto (as in *IWD '98, Proc. of the 5th Inter. Display Workshop* (preliminary) (1998), 143).

In OCB-mode liquid crystal cells, the rod liquid-crystalline molecules are substantially oppositely (symmetrically) oriented in the upper and lower parts of the liquid crystal cell. Having the constitution, the cells have a function of self-optical compensation. Their details are described in U.S. Pat. Nos. 4,583,825, 5,410,422.

ECB-mode liquid crystal cells are characterized in that the liquid crystal molecules therein are horizontally oriented, and their details are described in JP-A 203946/1993.

Reflection and semi-transmission liquid crystal displays are usable in any normally white mode that gives light display images under low voltage but gives dark display images under high voltage and in any normally black mode that gives dark display images under low voltage but gives light display images under high voltage, but are more favorable to normally white mode devices.

[Application to Touch Panel and Organic EL Displays]

The optical compensating film of the invention is applicable to touch panels such as those in JP-A 127822/1993, 48913/2002.

The optical compensating film of the invention is also applicable to organic EL displays such as those in JP-A 305729/1999, 307250/1999, 267097/2000.

EXAMPLES

Examples of the invention are described below, to which, however, the invention is not limited.

(1) Measurement of Haze:

The haze of each cellulose acetate film (optical compensating film) produced is measured with a haze meter (NDH1001-DP, from Nippon Denshoku Kogyo). Concretely, five random points of one sample are measured, and their data are averaged to be the haze of the sample.

(2) Measurement of Water Content:

The water content of each sample is measured according to the Curl-Fisher method, which is as follows:

(i) The sample to be measured (0.9 m×4.5 cm, two sheets) is weighed.
Water on the surfaces of wet samples is rapidly removed. Immediately after its sampling, the sample is put into a ground stopper bottle of glass, and is carried to a moisture meter. Within 3 minutes after its sampling, the water content of the sample is measured.
(ii) Using a moisture meter mentioned below, the water content of the sample is measured.
Using an evaporator, Mitsubishi Chemical's VA-05 Model, water in the sample was evaporated away at 150° C. and introduced into a moisture meter.
Using a moisture meter, Curl-Fisher Moisture Meter (Mitsubishi Chemical's CA-03 Model), the amount of water introduced thereinto from the evaporator is measured.
(iii) Computation of water content:
The water content of the sample is computed as follows:

Water content (%)=0.1×(W/F)

in which W is the water content (μg) indicated by the moisture meter and F is the weight (mg) of the sample.

(3) Water Film on Cellulose Acetate Film:
Filter paper is pressed against the cellulose acetate film just before stretched, and the area of the filter paper having absorbed water from the film to change its color is measured. The area thus measured is divided by the overall area of the filter paper, and it is represented in terms of percentage.

(4) Measurement of Retardation and NZ Factor:
The retardation and the NZ factor of each optical compensating film are measured as follows:
(i) Re450, Re550, Re590:
Using an automatic birefringence refractometer (KOBRA-21ADH/PR, from Oji Test Instruments), the retardation value of the sample film is measured with a ray of 450 nm, 550 nm or 590 nm applied in the direction perpendicular to the film surface.
(ii) NZ factor ((nx−nz)/(nx−ny)):
Using an automatic birefringence refractometer (KOBRA-21ADH/PR, from Oji Test Instruments), the retardation of the sample film is measured with a ray of 550 nm applied in the direction inclined by 40 degrees or −40 degrees from the direction perpendicular to the film surface, and Re(0), Re(4) and Re(−40) are obtained. From these, obtained are the refractive index, nx, in the direction of the phase lag axis of the film, the refractive index, ny, in the direction perpendicular to the in-plane phase lag axis of the film, and the refractive index, nz, in the direction of the thickness of the film. From the thus-obtained data, the value of (nx−nz)/(nx−ny) is computed.

(5) Measurement of Degree of Acetyl Substitution:
According to the method described in *Polymer Journal* 17, 1065–1069 (1985), the degree of acetyl substitution of each sample is measured through $^{13}$C-NMR spectrometry.

(Formation of Cellulose Acetate Film 1)
A cellulose acetate solution having the composition mentioned below was prepared.

| Composition of Cellulose Acetate Solution | |
|---|---|
| Cellulose acetate (degree of acetylation, 60.9%) | 100 wt. pts. |
| Triphenyl phosphate (plasticizer) | 10.0 wt. pts. |

-continued

| Composition of Cellulose Acetate Solution | |
|---|---|
| Biphenyldiphenyl phosphate (plasticizer) | 5.0 wt. pts. |
| Methylene chloride (first solvent) | 565.6 wt. pts. |
| Methanol (second solvent) | 49.2 wt. pts. |
| Retardation-controlling agent | 1.97 wt. pts. |
| Silica particles (20 nm) | 0.05 wt. pts. |

For the retardation-controlling agent, used was the following rod compound:

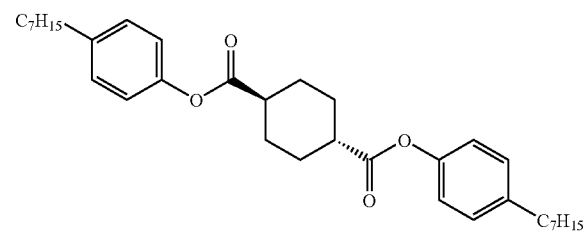

The UV and visible (UV-vis) spectrum of the retardation-controlling agent was measured according to the method mentioned above. It gave an absorption maximum at a wavelength (λmax) of 230 nm and its absorption coefficient (ε) was 16000.

The resulting dope was cast on a film-forming band, and dried at room temperature for 1 minute and then at 45° C. for 5 minutes. After dried, the amount of the solvent still remaining in the film was 30% by weight. The cellulose acetate film was peeled from the band, and dried at 100° C. for 10 minutes and then at 130° C. for 20 minutes. This is cellulose acetate film 1. The amount of the solvent still remaining in the film 1 was 0.1% by weight, and the film thickness was 130 μm.

(Formation of Cellulose Acetate Film 2)
A cellulose acetate solution having the composition mentioned below was prepared.

| Composition of Cellulose Acetate Solution | |
|---|---|
| Cellulose acetate (degree of acetylation, 60.9%) | 100 wt. pts. |
| Triphenyl phosphate (plasticizer) | 10.0 wt. pts. |
| Biphenyldiphenyl phosphate (plasticizer) | 5.0 wt. pts. |
| Methylene chloride (first solvent) | 534.9 wt. pts. |
| Methanol (second solvent) | 79.9 wt. pts. |
| Retardation-controlling agent | 1.97 wt. pts. |
| Silica particles (20 nm) | 0.05 wt. pts. |

The retardation-controlling agent used herein is the same as that used in the cellulose acetate film 1.
The resulting dope was cast on a film-forming band, and dried at room temperature for 1 minute and then at 45° C. for 5 minutes. After dried, the amount of the solvent still remaining in the film was 30% by weight. The cellulose acetate film was peeled from the band, and dried at 100° C. for 10 minutes and then at 130° C. for 20 minutes. This is cellulose acetate film 2. The amount of the solvent still remaining in the film 2 was 0.1% by weight, and the film thickness was 130 μm.

(Formation of Cellulose Acetate Film 3)
A cellulose acetate solution having the composition mentioned below was prepared.

| Composition of Cellulose Acetate Solution | |
| --- | --- |
| Cellulose acetate (degree of acetylation, 60.9%) | 100 wt. pts. |
| Triphenyl phosphate (plasticizer) | 10.0 wt. pts. |
| Biphenyldiphenyl phosphate (plasticizer) | 5.0 wt. pts. |
| Methylene chloride (first solvent) | 534.9 wt. pts. |
| Methanol (second solvent) | 79.9 wt. pts. |
| Retardation-controlling agent | 1.97 wt. pts. |
| Silica particles (20 nm) | 0.05 wt. pts. |

For the retardation-controlling agent, used was the following tabular compound.

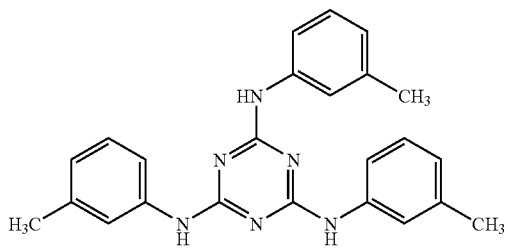

The resulting dope was cast on a film-forming band, and dried at room temperature for 1 minute and then at 45° C. for 5 minutes. After dried, the amount of the solvent still remaining in the film was 30% by weight. The cellulose acetate film was peeled from the band, and dried at 100° C. for 10 minutes and then at 130° C. for 20 minutes. This is cellulose acetate film 3. The amount of the solvent still remaining in the film 3 was 0.1% by weight, and the film thickness was 130 µm.

(Formation of Cellulose Acetate Film 4)

A cellulose acetate solution having the composition mentioned below was prepared.

| Composition of Cellulose Acetate Solution | |
| --- | --- |
| Cellulose triacetate (degree of acetylation, 60.3%) | 20 wt. pts. |
| Methyl acetate | 58 wt. pts. |
| Acetone | 5 wt. pts. |
| Methanol | 5 wt. pts. |
| Ethanol | 5 wt. pts. |
| Butanol | 5 wt. pts. |
| Retardation-controlling agent | 1.0 wt. pt. |
| Plasticizer A (ditrimethylolpropane tetraacetate) | 1.2 wt. pts. |
| Plasticizer B (triphenyl phosphate) | 1.2 wt. pts. |
| UV absorbent a: | |
| 2,4-bis (n-octylthio-6-(4-hydroxy-3,5-di-tert-butylanilino)-1,3,5-triazine | 0.2 wt. pts |
| UV absorbent b: | |
| 2-(2'-hydroxy-3',5'-di-tert-butylphenyl)-5-chlorobenzotriazole | 0.2 wt. pts. |
| UV absorbent c: | |
| 2-(2'-hydroxy-3',5'-di-tert-amylphenyl)-5-chlorobenzotriazole | 0.2 wt. pts |
| $C_{12}H_{25}OCH_2CH_2O$—$P(=O)$—$(OK)_2$ (release agent) | 0.02 wt. pts |
| Citric acid (release agent) | 0.02 wt. pts. |
| Silica particles (particle size, 20 nm; Mohs hardness, about 7) | 0.05 wt. pts. |

The retardation-controlling agent used herein is the same as that used in the cellulose acetate film 1. In the cellulose acetate used herein, the 6-position is acetylated to a higher degree than the 2- and 3-positions. In this, the degree of acetylation at the 6-, 2- and 3-positions is 20.5%, 19.9% and 19.9%, respectively.

The constitutive components were dissolved according to a cooling dissolution method mentioned below. Concretely, the compounds were gradually added to the solvent with full stirring, and then left at room temperature (25° C.) for 3 hours for which the compounds well swelled. With gradually stirring it, the resulting swollen mixture was cooled to −30° C. at a rate of −8° C./min, and then to −70° C. After 6 hours, this was then heated at a rate of +8° C./min. In the stage when this formed a sol in some degree, stirring it was started. This was further heated up to 50° C. to obtain a dope.

The resulting dope was cast on a film-forming band, and dried at room temperature for 1 minute and then at 45° C. for 5 minutes. After dried, the amount of the solvent still remaining in the film was 30% by weight. The cellulose acetate film was peeled from the band, and dried at 100° C. for 10 minutes and then at 130° C. for 20 minutes. This is cellulose acetate film 4. The amount of the solvent still remaining in the film 4 was 0.1% by weight, and the film thickness was 130 µm.

(Preliminary Experiment 1 for Film to Absorb Water)

The cellulose acetate film 1 formed in the above was dipped in a water thermostat at 80° C., and it was analyzed in point of the relation between the dipping time and the water content of the film. Dipped in water for 0 minute, 1 minute, 2 minutes, 4 minutes, 8 minutes and 20 minutes, the water content of the film was 1.89% by weight, 3.78% by weight, 4.21% by weight, 4.53% by weight, 4.79% by weight and 4.83% by weight, respectively. The other cellulose acetate films 2 to 4 were also analyzed in the same manner as above in point of the dipping time and the water content thereof. The results of these films were almost the same as those of the film 1.

(Preliminary Experiment 2 for Film to Absorb Water)

The cellulose acetate film 1 formed in the above was put in a high-humidity thermostat at 80° C. and 95% RH, and it was analyzed in point of the relation between the moisturizing time and the water content of the film. Moisturized for 0 minute, 1 minute, 2 minutes, 4 minutes, 8 minutes and 20 minutes, the water content of the film was 1.89% by weight, 2.91% by weight, 3.25% by weight, 3.54% by weight, 3.57% by weight and 3.56% by weight, respectively. The other cellulose acetate films 2 to 4 were also analyzed in the same manner as above in point of the moisturizing time and the water content thereof. The results of these films were almost the same as those of the film 1.

Example 1

(Formation of Optical Compensating Film 1)

The cellulose acetate film 1 formed in the above was dipped in a water thermostat at 80° C. for 5 minutes. Thus dipped, the film absorbed water to have a water content of 4.63% by weight. Then, this was put into an air thermostat at 90° C., and then immediately stretched by 42.5%. This was stretched in a clip-to-clip stretching method, in which the aspect ratio (L/W) was 0.8 and the stretching time was 9 seconds. Immediately after stretched, the water content of the film was 4.7% by weight. Next, this was dried in a thermostat at 80° C. for 3 minutes, and then conditioned at 25° C. and 60% RH for at least 2 hours. The optical properties of the film were measured, and the data obtained are given in Table 1. After stretched, the thickness of the film was 115 μm.

Example 2

(Formation of Optical Compensating Film 2)

The cellulose acetate film 1 formed in the above was dipped in a water thermostat at 80° C. for 5 minutes. Thus dipped, the film absorbed water to have a water content of 4.63% by weight. Then, this was put into a high-humidity thermostat at 70° C. and 95% RH, and then immediately stretched by 35%. This was stretched in a clip-to-clip stretching method, in which the stretch aspect ratio (L/W) was 0.8 and the stretching time was 7 seconds. Immediately after stretched, the water content of the film was 4.8% by weight. After taken out, the film was dried in a thermostat at 80° C. for 3 minutes, and then conditioned at 25° C. and 60% RH for at least 2 hours. The optical properties of the film were measured, and the data obtained are given in Table 1. After stretched, the thickness of the film was 117 μm.

Example 3

(Formation of Optical Compensating Film 3)

The cellulose acetate film 1 formed in the above was dipped in a water thermostat at 80° C. for 5 minutes. Thus dipped, the film absorbed water to have a water content of 4.63% by weight. Then, this was put into a high-humidity thermostat at 70° C. and 95% RH, and then immediately stretched by 42.5%. This was stretched in a clip-to-clip stretching method, in which the stretch aspect ratio (L/W) was 1.0 and the stretching time was 9 seconds. Immediately after stretched, the water content of the film was 4.8% by weight. After taken out, the film was dried in a thermostat at 80° C. for 3 minutes, and then conditioned at 25° C. and 60% RH for at least 2 hours. The optical properties of the film were measured, and the data obtained are given in Table 1. After stretched, the thickness of the film was 115 μm.

Example 4

(Formation of Optical Compensating Film 4)

The cellulose acetate film 1 formed in the above was put in a high-humidity thermostat at 80° C. and 95% RH for 5 minutes. Thus put therein, the film absorbed water to have a water content of 3.55% by weight, and it was stretched by 45.0%. This was stretched in a clip-to-clip stretching method, in which the stretch aspect ratio (L/W) was 1.0 and the stretching time was 9 seconds. Immediately after stretched, the water content of the film was 4.8% by weight. After taken out, the film was dried in a thermostat at 80° C. for 3 minutes, and then conditioned at 25° C. and 60% RH for at least 2 hours. The optical properties of the film were measured, and the data obtained are given in Table 1. After stretched, the thickness of the film was 115 μm.

Example 5

(Formation of Optical Compensating Film 5)

The cellulose acetate film 1 formed in the above was put in a high-humidity thermostat at 80° C. and 95% RH for 5 minutes. Thus put therein, the film absorbed water to have a water content of 3.55% by weight. Then, this was stretched by 45.0% while exposed to high-pressure water vapor at 120° C. for 2 seconds. This was stretched in a clip-to-clip stretching method, in which the stretch aspect ratio (L/W) was 1.0 and the stretching time was 9 seconds. Immediately after stretched, the water content of the film was 3.7% by weight. After taken out, the film was dried in a thermostat at 80° C. for 3 minutes, and then conditioned at 25° C. and 60% RH for at least 2 hours. The optical properties of the film were measured, and the data obtained are given in Table 1. After stretched, the thickness of the film was 115 μm.

Comparative Example 1

(Formation of Optical Compensating Film 6)

The cellulose acetate film 1 formed in the above was put in a thermostat at 130° C. for 5 minutes. Thus put therein, the film had a water content of 0.4% by weight, and then it was stretched by 37%. This was stretched in a clip-to-clip stretching method, in which the stretch aspect ratio (L/W) was 3.3. Then, the film was conditioned at 25° C. and 60% RH for at least 2 hours. The optical properties of the film were measured, and the data obtained are given in Table 1. After stretched, the thickness of the film was 115 μm.

TABLE 1

|  | Example 1 | Example 2 | Example 3 | Example 4 | Example 5 | Comp. Ex. 1 |
| --- | --- | --- | --- | --- | --- | --- |
| Draw Ratio | 42.5% | 35.0% | 42.5% | 45.0% | 45.0% | 37.0% |
| Re450 [nm] | 128 | 106 | 129 | 121 | 123 | 124 |
| Re550 [nm] | 142 | 118 | 143 | 134 | 137 | 138 |
| Re590 [nm] | 145 | 120 | 146 | 137 | 140 | 141 |
| $(n_x - n_z)/(n_x - n_y)$ (NZ factor) | 1.62 | 1.85 | 1.66 | 1.76 | 1.60 | 1.32 |
| Haze | 0.3 | 0.4 | 2.0 | 0.4 | 0.5 | 0.4 |

The other cellulose acetate films 2 to 4 formed in the above were processed in the same manner as in Examples 1 to 5 into optical compensating films, all of which had almost the same data as in Table 1.

Example 6

(Fabrication of Circularly Polarizing Plates)

A PVA film was dipped in an aqueous solution of iodine (2.0 g/liter) and potassium iodide (4.0 g/liter) at 25° C. for 240 seconds, and then in an aqueous solution of boric acid (10 g/liter) at 25° C. for 60 seconds. Then, this was introduced into a tenter-type stretching machine as in FIG. 7, and stretched 5.3-fold therein. The tenter in the machine is so designed that it bends in the machine direction as in FIG. 7, and after the bent zone, its width is kept constant. After dried in an atmosphere at 80° C., the stretched film was taken out of the tenter. The film-traveling speed difference between the tenter clips on both sides of the tenter was smaller than 0.05%, and the angle of the centerline of the film just having been introduced into the tenter to the centerline of the stretched film to be fed to the next stage was 46°. In this step, |L1−L2| was 0.7 m and W was 0.7 m, or that is, |L1−L2|=W. At the tenter outlet, the tilt angle of the substantial stretched direction, Ax−Cx, of the film to the centerline 22 of the stretched film to be fed to the next stage was 45°. At the tenter outlet, neither film shrinkage nor film deformation was found. Using an adhesive of aqueous 3% PVA (Kuraray's PVA-117H) solution, a saponified film of Fuji Photo Film's Fujitac (cellulose triacetate having a retardation value of 3.0 nm), and the optical compensating film 4 of Example 4 that had been saponified on its one surface were laminated with the polarizing film prepared herein, in a mode of roll-to-roll lamination where the adhesive-coated surface of each film was kept in contact with the polarizing film. The process gave a circularly polarizing plate. The same process, in which, however, the optical compensating film 5 of Example 5 that had been saponified in the same manner on its one surface was used in place of the optical compensating film 4, also gave a circularly polarizing plate.

The optical properties of the circularly polarizing plates thus fabricated herein were measured. Both the circularly polarizing plates attained almost complete circular polarization in a broad wavelength range (450 to 590 nm).

Example 7

(Fabrication of TN-Mode Reflection Liquid Crystal Displays)

A glass substrate with an ITO transparent electrode mounted thereon, and a glass substrate with a surface-roughened, reflective aluminium electrode mounted thereon were prepared. An orientation film of polyimide (SE-7992 from Nissan Chemical) was formed on the electrode of each of the two glass substrates, and rubbed. Via a 1.7 μm-spacer put therebetween, the two substrates were stacked with their orientation films facing each other. In stacking them, the two substrates were so controlled that the rubbing directions of the two orientation films thereon cross at an angle of 110°. A liquid crystal (MLC-6252 from Merck) was introduced into the space between the substrates to form a liquid crystal layer therebetween. The process gave a TN-mode liquid crystal cell having a twist angle of 70° and a value Δnd of 269 nm.

Any of the two circularly polarizing plates that had been fabricated in Example 6 (each laminated with a protective film of which the surface had been AR-processed) was stuck to the ITO transparent electrode-having glass substrate on its side opposite to the side of the electrode thereof, in such a manner that the cellulose acetate film of the polarizing plate faces the substrate.

A rectangular wave voltage of 1 kHz was applied to the thus-fabricated, reflection liquid crystal display. The display was visually checked at 1.5 V for white expression and 4.5V for black expression. It was confirmed that both the white expression and the black expression were neutral gray with no other color.

Next, using a contrast meter (EZ Contrast 160D from Eldim), the contrast ratio of the reflection brightness of the display was measured. The contrast ratio in front of the display was 25, and the field of view (view angle) to give a contrast ratio of 10 was at least 120° in the vertical direction and at least 120° in the horizontal direction. In a durability test at 60° C. and 90% RH for 500 hours, the display was good with no problem of expression.

Example 8

(Fabrication of STN-Mode Reflection Liquid Crystal Displays)

A glass substrate with an ITO transparent electrode mounted thereon, and a glass substrate with a smooth reflective aluminium electrode mounted thereon were prepared. An orientation film of polyimide (SE-150 from Nissan Chemical) was formed on the electrode of each of the two glass substrates, and rubbed. Via a 6.0 μm-spacer put therebetween, the two substrates were stacked with their orientation films facing each other. In stacking them, the two substrates were so controlled that the rubbing directions of the two orientation films thereon cross at an angle of 60°. A liquid crystal (ZLI-2977 from Merck) was introduced into the space between the substrates to form a liquid crystal layer therebetween. The process gave an STN-mode liquid crystal cell having a twist angle of 240° and a value Δnd of 791 nm.

Using an adhesive, an internal diffusive sheet (IDS from Dai-Nippon Printing) and any of the two circularly polarizing plates that had been fabricated in Example 6 were stuck in that order to the ITO transparent electrode-having glass substrate on its side opposite to the side of the electrode thereof, in such a manner that the polarizing plate is the outermost layer.

A rectangular wave voltage of 55 Hz was applied to the thus-fabricated, reflection liquid crystal display. The display was visually checked at 2.0 V for black expression and at 2.5 V for white expression. It was confirmed that both the white expression and the black expression were neutral gray with no other color.

Next, using a contrast meter (EZ Contrast 160D from Eldim), the contrast ratio of the reflection brightness of the display was measured. The contrast ratio in front of the display was 8, and the field of view (view angle) to give a contrast ratio of 3 was 90° in the vertical direction and 105° in the horizontal direction.

Example 9

[VA-mode Liquid Crystal Displays]

Figure 9:
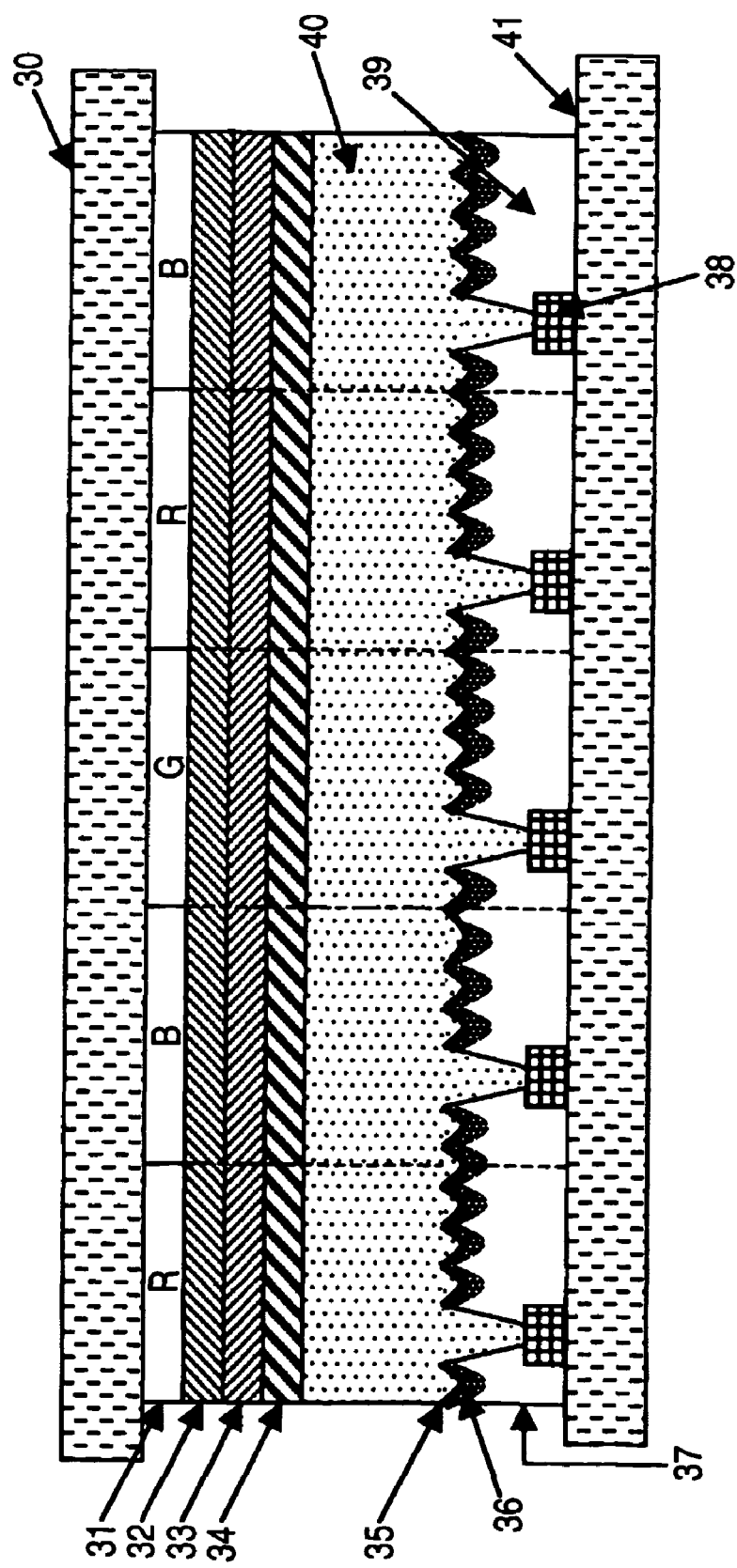
FIG. 9 is a cross-sectional view showing the constitution of the VA-mode liquid crystal display of Example 9.

FIG. 9 is a cross-sectional view showing the basic constitution of a VA-mode liquid crystal display. As in FIG. 9, the VA-mode liquid crystal display illustrated comprises a lower glass substrate 41, an insulation film 39, a thin-film transistor 38, a reflector 36, a lower orientation film 35, a liquid crystal 40, an upper orientation film 34, an ITO transparent electrode 33, an overcoat layer 32, a color filter 31 and an upper glass substrate 30 arrayed in that order from its bottom.

A glass substrate 30 with an ITO transparent electrode 33 mounted thereon, and a glass substrate 41 with a surface-roughened, reflective aluminium electrode 35 to 39 mounted thereon were prepared. Vertical orientation films (RN783 from Nissan Chemical) were prepared for the upper orientation film 34 and the lower orientation film 35, and they were rubbed. Via a 1.7 μm-spacer put therebetween, the two substrates were stacked with their orientation films facing each other. In stacking them, the two substrates were so controlled that the rubbing directions of the two orientation films thereon cross at an angle of 110°. A liquid crystal having Δn=0.08 and Δε=−4 (from Merck) was introduced through vacuum injection into the space between the substrates to form a liquid crystal layer (40) therebetween. The process gave a VA-mode liquid crystal cell having a twist angle of 45° and a value Δnd of 135 nm.

Using an adhesive, the optical compensating film formed in Example 4, and a commercially-available polarizing plate (HLC2-5618HCS from Sanritz) were stuck in that order to the ITO transparent electrode-having glass substrate on its side opposite to the side of the electrode thereof. In sticking the optical compensating film and the polarizing plate to the substrate, they were so controlled that the absorption axis of the polarizing plate crosses the phase lag axis of the optical compensating film at an angle of 45 degrees. The devices thus fabricated herein to have the optical compensating film 4 of Example 4 all had a broad field of view, concretely having a view angle of at least 160 degrees in the vertical direction and a view angle of at least 160 degrees in the horizontal direction. In place of the optical compensating film 4 of Example 4, the optical compensating film 5 of Example 5 was used to fabricate the devices of the same constitution as herein. Thus fabricated, all the devices also had a broad field of view, concretely having a view angle of at least 160 degrees in the vertical direction and a view angle of at least 160 degrees in the horizontal direction. However, when the optical compensating film 6 formed in Comparative Example 1 was used, the view angle of the devices was not larger than 140 degrees in both the vertical direction and the horizontal direction.

A VA-mode liquid crystal cell was formed in the same manner as herein, and the circularly polarizing plate formed in Example 6 was stuck to the ITO transparent electrode-having glass substrate on its side opposite to the side of the electrode thereof, using an adhesive. Thus fabricated, the device also had a broad field of view, concretely having a view angle of at least 160 degrees in the vertical direction and a view angle of at least 160 degrees in the horizontal direction.

As demonstrated herein, the angle dependency of the birefringence (Δn) of liquid crystal cells varies depending on the liquid crystal panels combined with the cells, and the view angle characteristic of liquid crystal displays could not be optimized by merely controlling Re. It is understood from the data in this example that the matter of importance for the view angle characteristic optimization in fabricating liquid crystal displays is to control the NZ factor of the optical compensating film used, not varying Re thereof.

Example 10

(ECB-Mode Liquid Crystal Displays)

According to the process of Example 1 in JP-A 316378/1999, circularly polarizing plates were fabricated in which, however, the optical compensating films 4, 5 and 6 that had been formed in Examples 4 and 5 and Comparative Example 1, respectively, were used for the second transparent support. When the optical compensating film was stuck to the polarizing film, they were so controlled that the absorption axis of the polarizing film crosses the phase lag axis of the optical compensating film at an angle of 45 degree. Using the circularly polarizing plates thus fabricated herein, ECB-mode liquid crystal displays were constructed according to the process of Example 6 in JP-A 316378/1999. The devices comprising the optical compensating film of the invention all had a broad field of view, concretely having a view angle of at least 120 degrees in the vertical direction and a view angle of at least 115 degrees in the horizontal direction. However, the devices comprising the optical compensating film of Example 1 were not so good, concretely having a view angle of not larger than 100 degrees in both the vertical direction and the horizontal direction.

Example 11

(Organic EL Device-Having Displays)

According to JP-A 267097/2000, a display having a constitution of protective tack (provided with an antireflection layer on its outermost surface)/polarizing film/optical compensating film/organic EL device/reflective electrode arrayed in that order from the side of viewers was fabricated, in which the optical compensating film 4 or 5 formed in Examples 4 or 5 was used. In this, the polarizing film and the optical compensating film were so arrayed that the transmission axis of the former crosses the phase lag axis of the latter at an angle of 45°. Thus fabricated, the display was visually checked for its color expression. It was confirmed that the black expression in the display is colored little, and therefore the contrast of the display is high and the visibility thereof is good.

Example 12

(Packaging in Semi-Transmission Devices)

Cybershot (from Sony) was modified as follows: The polarizing plate, the λ/2 plate and the λ/4 plate in the upper part of the liquid crystal cell in the liquid crystal display unit were peeled off. Using an adhesive, the optical compensating film 4 or 5 (λ/4 plate) formed in Example 4 or 5, and a commercially-available polarizing plate (HLC2-5618HCS from Sanritz) were laminated in that order on the glass substrate. In laminating the optical compensating film and the polarizing film on the substrate, they were so controlled that the absorption axis of the polarizing film crosses the phase lag axis of the optical compensating film at an angle of 45 degrees. The devices comprising the optical compensating film 4 or 5 of Examples 4 or 5 all had a broad field of view, concretely having a view angle of at least 120 degrees in the vertical direction and a view angle of at least 115 degrees in the horizontal direction.

Comparative Example 2

In the same manner as in Example 12, the device was modified, for which, however, used was the optical compensating film 6 formed in Comparative Example 1. The thus-modified device was inferior to those of Example 12 in point of the field of view. Concretely, its view angle was 100 degrees in the vertical direction and 100 degrees in the horizontal direction.

Example 13

(Packaging in Reflection Liquid Crystal Displays)

A tough panel-having reflection liquid crystal display (Sharp's Zaurus) was modified as follows: The polarizing plate and the optical compensating film in the structure of touch panel/polarizing plate/optical compensating film/liquid crystal cell of the display were peeled off and replaced with the optical compensating film 4 or 5 of Example 4 or 5 and a commercially-available polarizing plate (HLC2-5618HCS from Sanritz). For this, the polarizing plate and the optical compensating film were so controlled that the absorption axis of the former crosses the phase lag axis of the latter at an angle of 45 degrees. This is for maximizing the contrast of the modified device. Thus modified, the liquid crystal displays having the optical compensating film 4 or 5 of Example 4 or 5 had a broad field of view, concretely having a view angle of at least 120 degrees in the vertical direction and a view of angle of at least 115 degrees in the horizontal direction.

Comparative Example 3

In the same manner as in Example 13, the device was modified, for which, however, used was the optical compensating film 6 formed in Comparative Example 1. The thus-modified device was inferior to those of Example 13 in point of the field of view. Concretely, its view angle was 100 degrees in the vertical direction and 100 degrees in the horizontal direction.

Example 14

1. Formation of Optical Compensating Films (Stretched Cellulose Acetate Films):

(1) Composition:
A cellulose acetate dope (high-concentration solution) having the composition mentioned below was prepared. In this, the rod compound or the tabular compound mentioned above was used for the retardation-controlling agent (aromatic compound having at least two aromatic rings).

(α) Methylene Chloride (MC)-Based Composition:

| | |
|---|---:|
| Cellulose acetate (its degree of acetylation is in Table 2) | 100 wt. pts. |
| Triphenyl phosphate | 10 wt. pts. |
| Biphenyldiphenyl phosphate | 5 wt. pts. |
| Methylene chloride | 565.6 wt. pts. |
| Methanol | 49.2 wt. pts. |
| Retardation-controlling agent (Re-controlling agent) as in Table 2 | |
| Silica particles (particle size, 20 nm) | 0.05 wt. pts. |

(β) Methyl Acetate (MA)-Based Composition:

| | |
|---|---:|
| Cellulose acetate (its degree of acetylation is in Table 2) | 118 wt. pts. |
| Triphenyl phosphate | 9.19 wt. pts. |
| Biphenyldiphenyl phosphate | 4.60 wt. pts. |
| Tribenzylamine | 2.36 wt. pts. |
| Methyl acetate | 530 wt. pts. |
| Ethanol | 99.4 wt. pts |
| Butanol | 33.1 wt. pts. |
| Methylene chloride | 565.6 wt. pts. |
| Retardation-controlling agent (Re-controlling agent) as in Table 2 | |
| Silica particles (particle size, 20 nm) | 0.05 wt. pts. |

(2) Dissolution:
The MC-based composition was dissolved in a room-temperature dissolution method; and the MA-based composition was in a cooling dissolution method. The two gave two different dopes.

(a) Room-Temperature Dissolution Method:
With well stirring, the above-mentioned compounds were gradually added to the solvent, and left at room temperature (25° C.) for 3 hours for which they well swelled. The resulting swollen mixture was put into a mixer tank equipped with a reflex condenser, and dissolved with stirring at 50° C.

(b) Cooling Dissolution Method:
With well stirring, the above-mentioned compounds were gradually added to the solvent, and left at room temperature (25° C.) for 3 hours for which they well swelled. With gradually stirring, the resulting swollen mixture was cooled to −30° C. at a rate of −8° C./min, and then to −70° C. After 6 hours, this was then heated at a rate of +8° C./min. In the stage when this formed a sol in some degree, stirring it was started. This was further heated up to 50° C. to obtain a dope.

(3) Film Formation:
The dope was formed into a film according to any of the following two modes, as in Table 2.

(α) Single-Layer Film Formation:
The solution (dope) obtained in the method as above was filtered through filter paper (Azumi Filter's No. 244) and through flannel cloth, then fed into a pressure die via a metering gear pump. Using a casting machine with a band having an effective length of 6 m, this was cast on the band so that its final thickness after dried and stretched could be as in Table 2. The band temperature was 0° C. Thus cast, the film was exposed to air for 2 seconds to dry it. When the volatile content of the film reached 50% by weight, the film was peeled off from the band. Then, this was stepwise dried at 100° C. for 3 minutes, at 130° C. for 5 minutes and at 160° C. for 5 minutes, not fixed but allowed to freely shrink. Thus dried, the solvent remaining in the film was reduced to at most 1%.

(β) Multi-Layer Film Formation:
Using a three-layer co-casting die unit, the dope having the composition as above was cast through the center die on a metal support while, at the same time, the dope having been diluted to have an increased solvent content of 10% by weight was through the two outer dies thereon to. Thus co-cast, the multi-layer film was peeled off from the support and dried. This is a three-layered cellulose acetate film laminate of the invention (thickness of the inner layer/thickness of each surface layer=8/1). This was stepwise dried at 70° C. for 3 minutes and then at 130° C. for 5 minutes on a glass sheet, and the film was peeled off from the glass sheet. Then, this was further dried at 160° C. for 30 minutes to remove the solvent to obtain a dry cellulose acetate film.

Next, the film was trimmed by 15 cm at both edges, and its edges of 1 cm wide were knurled to a height of 50 μm. The non-stretched cellulose acetate film thus obtained had a width of 1.5 m and a length of 3000 m. The trimmed cellulose acetate film waste was ground, and then mixed with non-used cellulose acetate. In that manner, this is recycled. (The amount of the recycled cellulose acetate is 30% by weight of all cellulose acetate used herein.)

(4) Stretching:
Using at least two pairs of nip rolls as in the apparatus of any of FIG. 1 to FIG. 6, the cellulose acetate film was stretched under the condition indicated in Table 2. Concretely, the film was passed between the nip rolls while the rotation speed of the nip rolls at the outlet of the stretching unit is made to differ from that of the nip rolls at the inlet thereof. Thus stretched, this is an optical compensating film (phase-shift film) of the invention.

For making it absorb water before stretching, the film was dipped in water or exposed to water vapor. For the latter, the film was dipped in water at 90° C.; and for the latter, the film was exposed to water vapor at 120° C. Thus having absorbed water, the water content of the film is as in Table 2.

In case where two pairs of nip rolls were used, the film was stretched in one stage; and in case where three or more pairs of nip rolls were used, the film was stretched in multiple stages. In the multi-stage stretching process, the paired nip rolls were arrayed in tandem, and the draw ratios in all the stretching stages were multiplied. The resulting product is shown as the draw ratio in Table 2. In stretching the film through them, all the nip rolls were so controlled that the film could be uniformly stretched through them in every stretching stage.

The temperature difference in stretching the film is indicated by the equation mentioned below. In multi-stage stretching, the temperature condition was the same in every stage.

MD (Machine Direction):

Stretching temperature difference=(temperature in the center point between the outlet-side nip rolls and the inlet-side nip rolls)−(temperature just after the inlet-side nip rolls)

TD (Transverse Direction):

Stretching temperature difference=(mean temperature at both edges in TD)−(temperature in the center part in TD)

All the nip rolls used had a diameter of 30 cm. One of the paired nip rolls was covered with a 10 mm-thick rubber.

After stretched, every film was dried for 3 minutes, while conveyed under a tension of 10 kg/m at 80° C. Then, its both edges were knurled, and the stretched film was wound up.

After stretched, every film had a width of 1.2 m.

TABLE 2

| Optical Compensating film | Dope | | | | Number of Layers of Film | Moisturization before stertching | | |
|---|---|---|---|---|---|---|---|---|
| | Cellulose Acetate | | Re Improver | | | Water | | |
| | Type | degree of acetylation | weight* % | Type | | Method | Content % | Water Film % |
| Samples of the Invention | | | | | | | | |
| 11 | MC | 60.9 | 1.97 | Rod | 1 | exposure to water vapor | 4.5 | 3 |
| 12 | " | " | " | " | " | exposure to water vapor | " | " |
| 13 | " | " | " | " | " | exposure to water vapor | " | " |
| 14 | " | " | " | " | " | exposure to water vapor | " | 33 |
| 15 | " | " | " | " | " | exposure to water vapor | " | 3 |
| 16 | " | " | " | " | " | exposure to water vapor | " | " |
| 17 | " | " | " | " | " | exposure to water vapor | 2 | " |
| 18 | " | " | " | " | " | exposure to water vapor | 10 | " |
| 19 | " | " | 10 | " | " | exposure to water vapor | 4.5 | " |
| 20 | " | " | 0.01 | " | " | exposure to water vapor | " | " |
| 21 | MA | 57 | 5 | Tabular | 3 | dipping in water | 7 | 26 |
| 22 | MC | 62.5 | 0.8 | " | 1 | exposure to water vapor | 3 | 15 |
| Comparative Sample 23 | MC | 60.9 | 1.97 | Rod | 1 | exposure to water vapor | 1 | 3 |

| Optical Compensating film | Stretching Step | | | | | | | | |
|---|---|---|---|---|---|---|---|---|---|
| | Stretching Temperature Difference | | | Stretching | | | | after stretched | |
| | average ° C. | Difference in TD ° C. | Difference in MD ° C. | Draw Ratio | Aspect Ratio (L/W) | Time (sec) | Atmosphere humidity %** | Paired Nip Rolls | Water Content % | Thickness μm |
| Samples of the Invention | | | | | | | | | | |
| 11 | 80 | 4 | 4 | 1.45 | 1.1 | 9 | exposure to water vapor | 95 | 2 | 4.1 | 115 |

TABLE 2-continued

| | | | | | | | | | | | |
|---|---|---|---|---|---|---|---|---|---|---|---|
| 12 | " | 0 | 0 | 4 | " | " | exposure to water vapor | " | " | " | " |
| 13 | " | 25 | 25 | 0 | " | " | exposure to water vapor | " | " | " | " |
| 14 | " | " | " | 25 | " | " | exposure to water vapor | " | " | " | " |
| 15 | " | " | " | " | 0.5 | " | exposure to water vapor | " | " | " | " |
| 16 | " | " | " | " | 2.5 | " | exposure to water vapor | " | " | " | " |
| 17 | 150 | " | " | " | 1.1 | " | exposure to water vapor | " | " | 1 | " |
| 18 | 70 | " | " | " | " | " | exposure to water vapor | " | " | 9 | " |
| 19 | 80 | " | " | " | " | " | exposure to water vapor | " | " | 4.1 | " |
| 20 | " | " | " | " | " | " | exposure to water vapor | " | " | 4.1 | " |
| 21 | 70 | 2 | 18 | 1.2 | 0.8 | 2 | exposure to water vapor | 80 | 2 | 6 | 245 |
| 22 | 100 | 18 | 2 | 1.9 | 1.5 | 29 | dipping in water | — | 4 | 2 | 45 |
| Comparative Sample 23 | 80 | 4 | 4 | 1.1 | 1.1 | 9 | exposure to water vapor | 95 | 2 | 4.1 | 115 |

*relative to cellulose acetate
**relative humidity (5) Evaluation of Optical Compensating Films (Phase-Shift Films):

The optical properties of the thus-obtained optical compensating films 11 to 23 are shown in Table 3. Re550 was measured at the center part in the transverse direction and at the two edges (of which the data were averaged) of each film. The others except it were measured all at the center part of each film.

In Table 3, also shown are the data of the contrast ratio and the view angle measured with the TN-mode, STN-mode and HAN-mode liquid crystal displays fabricated hereinunder.

TABLE 3

| | Re | | | | $(n_x - n_y)/$ $(n_z - n_y)$ | | | Reflection Liquid Crystal Display TN-mode | |
|---|---|---|---|---|---|---|---|---|---|
| | Re550 | | | | | | | view angle | |
| Optical Compensating Film | center mm | edge mm | Re450/ Re550 | Re650/ Re550 | (NZ factor) | Haze % | contrast ratio | vertical direction degrees | horizontal direction degrees |
| (Samples of the Invention) | | | | | | | | | |
| 11 | 138 | 138 | 0.83 | 1.15 | 1.6 | 0.3 | 25 | 125 | 125 |
| 12 | " | 155 | " | " | " | " | 22 | 115 | 115 |
| 13 | " | 115 | " | " | " | " | 23 | 115 | 115 |
| 14 | " | 150 | " | " | " | 1.9 | 24 | 115 | 120 |
| 15 | 270 | 330 | 0.65 | 1.30 | 1.2 | 1.1 | 21 | 110 | 110 |
| 16 | 95 | 105 | 0.94 | 1.06 | 2.5 | 0.7 | 21 | 110 | 110 |
| 17 | 200 | 240 | 0.75 | 1.24 | 1.3 | 0.5 | 21 | 115 | 110 |
| 18 | 110 | 120 | 0.88 | 1.09 | 1.9 | 0.7 | 21 | 110 | 115 |
| 19 | 83 | 86 | 0.98 | 1.02 | 1.1 | 0.2 | 20 | 105 | 110 |
| 20 | 310 | 320 | 0.53 | 1.34 | 2.9 | 1.5 | 20 | 105 | 105 |

TABLE 3-continued

|    |     |     |      |      |     |     | Reflection Liquid Crystal Display | | |
|----|-----|-----|------|------|-----|-----|-----|-----|-----|
| 21 | 155 | 170 | 0.79 | 1.20 | 1.7 | 0.4 | 22 | 120 | 115 |
| 22 (Comparative Sample) | 120 | 125 | 0.71 | 1.20 | 2.2 | 2.2 | 20 | 110 | 110 |
| 23 | 270 | 360 | 0.4  | 1.45 | 0.8 | 2.4 | 15 | 90  | 90  |

| | Reflection Liquid Crystal Display | | | | | |
|---|---|---|---|---|---|---|
| | STN-mode | | | HAN-mode | | |
| | | view angle | | | view angle | |
| Optical Compensating Film | contrast ratio | vertical direction degrees | horizontal direction degrees | contrast ratio | vertical direction degrees | horizontal direction degrees |
| (Samples of the Invention) | | | | | | |
| 11 | 8   | 90 | 105 | 8   | 125 | 125 |
| 12 | 7   | 80 | 90  | 7   | 110 | 110 |
| 13 | 7   | 80 | 90  | 7   | 110 | 105 |
| 14 | 7   | 85 | 90  | 7   | 110 | 110 |
| 15 | 6   | 80 | 85  | 6   | 100 | 105 |
| 16 | 6   | 80 | 85  | 6   | 105 | 100 |
| 17 | 6   | 85 | 80  | 6   | 100 | 105 |
| 18 | 6   | 85 | 80  | 6   | 100 | 105 |
| 19 | 5.5 | 80 | 80  | 5.5 | 100 | 100 |
| 20 | 5.5 | 80 | 80  | 5.5 | 100 | 100 |
| 21 | 7   | 85 | 95  | 7   | 115 | 110 |
| 22 (Comparative Sample) | 5 | 80 | 80 | 5 | 100 | 100 |
| 23 | .   | 70 | 70  | 4   | 90  | 90  |

2. Fabrication of Circularly Polarizing Plates:

(1) Formation of Polarizing Film:

PVA having a mean degree of polymerization of 4000 and a degree of saponification of 99.8 mol % was dissolved in water to prepare an aqueous 4.0% PVA solution. The solution was cast on a band, dried, peeled off from the band, stretched in dry in the machine direction, directly dipped in an aqueous solution of iodine (0.5 g/liter) and potassium iodide (50 g/liter) at 30° C. for 1 minute and then in an aqueous solution of boric acid (100 g/liter) and potassium iodide (60 g/liter) at 70° C. for 5 minutes, rinsed in water at 20° C. for 10 minutes, and then dried at 80° C. for 5 minutes. The process gave a long-continuous polarizing film (CHM-1). Its width was 1290 mm and its thickness was 20 μm.

(2) Saponification of Optical Compensating Film:

Using a bar #3, a saponifying agent mentioned below was applied to one surface of each of the optical compensating films 11 to 23 at 60° C. After 30 seconds, the films were rinsed in water and dried.

Saponifying agent: KOH was dissolved in iso-propanol/propylene glycol/water (70/15/15, by volume) to prepare a 1.5 N KOH solution. This is the saponifying agent used herein.

(3) Fabrication of Circularly Polarizing Plates:

Any of the optical compensating films (phase-shift films) 11 to 23, the polarizing film formed in the above, and a commercially-available cellulose acetate film (Fujitac from Fuji Photo Film) were laminated in that order through roll-to-roll lamination to fabricate circularly polarizing plates. In these, the saponified surface of the phase-shift film was made to face the underlying polarizing film. The samples cut out of the two edges of each stretched film, of which the optical properties vary most significantly, were used herein.

The optical properties of the thus-fabricated circularly polarizing plates were measured. Those comprising the optical compensating film of the invention all attained almost complete circular polarization in a broad wavelength range (450 to 590 nm).

3. Fabrication of TN-Mode Reflection Liquid Crystal Displays:

A glass substrate with an ITO transparent electrode mounted thereon, and a glass substrate with a surface-roughened, reflective aluminium electrode mounted thereon were prepared. An orientation film of polyimide (SE-7992 from Nissan Chemical) was formed on the electrode of each of the two glass substrates, and rubbed. Via a 3.4 μm-spacer put therebetween, the two substrates were stacked with their orientation films facing each other. In stacking them, the two substrates were so controlled that the rubbing directions of the two orientation films thereon cross at an angle of 110°. A liquid crystal (MLC-6252 from Merck) was introduced into the space between the substrates to form a liquid crystal layer therebetween. The process gave a TN-mode liquid crystal cell (diagonal length; 12 inches) having a twist angle of 70° and a value Δnd of 269 nm.

Any of the circularly polarizing plates that had been fabricated in the above (each laminated with a protective film of which the surface had been AR-processed) was stuck to the ITO transparent electrode-having glass substrate on its side opposite to the side of the electrode thereof, in such a manner that the cellulose acetate film of the polarizing plate faces the substrate.

A rectangular wave voltage of 1 kHz was applied to the thus-fabricated, reflection liquid crystal display. The display was visually checked at 1.5 V for white expression and 4.5 V for black expression. It was confirmed that both the white expression and the black expression were neutral gray with no other color.

Next, using a contrast meter (EZ Contrast 160D from Eldim), the contrast ratio of the reflection brightness of the display was measured. The data of the contrast ratio in front of the display and the field of view (view angle) to give a contrast ratio of 3 are shown in Table 2. Though the edges of the stretched film, of which the optical properties vary most significantly, were used for the optical compensating films herein and though the displays fabricated all had a relatively large picture plane (diagonal length, 12 inches), good pictures were seen in the entire region of the large picture plane.

4. Fabrication of STN-Mode Reflection Liquid Crystal Displays:

A glass substrate with an ITO transparent electrode mounted thereon, and a glass substrate with a smooth reflective aluminium electrode mounted thereon were prepared. An orientation film of polyimide (SE-150 from Nissan Chemical) was formed on the electrode of each of the two glass substrates, and rubbed. Via a 6.0 μm-spacer put therebetween, the two substrates were stacked with their orientation films facing each other. In stacking them, the two substrates were so controlled that the rubbing directions of the two orientation films thereon cross at an angle of 60°. A liquid crystal (ZLI-2977 from Merck) was introduced into the space between the substrates to form a liquid crystal layer therebetween. The process gave an STN-mode liquid crystal cell (diagonal length, 12 inches) having a twist angle of 240° and a value Δnd of 791 nm.

Using an adhesive, an internal diffusive sheet (IDS from Dai-Nippon Printing) and the circularly polarizing plate that had been fabricated in the above were stuck in that order to the ITO transparent electrode-having glass substrate on its side opposite to the side of the electrode thereof, in such a manner that the polarizing plate is the outermost layer.

A rectangular wave voltage of 55 Hz was applied to the thus-fabricated, reflection liquid crystal display. The display was visually checked at 2.0 V for black expression and at 2.5 V for white expression. It was confirmed that both the white expression and the black expression were neutral gray with no other color.

Next, using a contrast meter (EZ Contrast 160D from Eldim), the contrast ratio of the reflection brightness of the display was measured. The data of the contrast ratio in front of the display and the field of view (view angle) to give a contrast ratio of 3 are shown in Table 2.

Though the edges of the stretched film, of which the optical properties vary most significantly, were used for the optical compensating films herein and though the displays fabricated all had a relatively large picture plane (diagonal length, 12 inches), good pictures were seen in the entire region of the large picture plane.

5. Fabrication of HAN-Mode Reflection Liquid Crystal Displays:

A glass substrate with an ITO transparent electrode mounted thereon, and a glass substrate with a smooth reflective aluminium electrode mounted thereon were prepared. An orientation film of polyimide (SE-610 from Nissan Chemical) was formed on the electrode of the ITO transparent electrode-having glass substrate, and rubbed. On the other hand, a vertical orientation film (SE-1211 from Nissan Chemical) was formed on the electrode of the reflective aluminium electrode-having glass substrate. The orientation film on the reflective aluminium electrode was not rubbed. Via a 4.0 μm-spacer put therebetween, the two substrates were stacked with their orientation films facing each other. A liquid crystal (ZLI-1565 from Merck) was introduced into the space between the substrates to form a liquid crystal layer therebetween. The process gave a HAN-mode liquid crystal cell (diagonal length, 12 inches) having a value Δnd of 519 nm.

Using an adhesive, the circularly polarizing plate that had been fabricated in the above was stuck to the ITO transparent electrode-having glass substrate on its side opposite to the side of the electrode thereof. In addition, a light-diffusive film (Lumisty from Sumitomo Chemical) was stuck thereto.

A rectangular wave voltage of 55 Hz was applied to the thus-fabricated, reflection liquid crystal display. The display was visually checked at 0.8 V for black expression and at 2.0 V for white expression. It was confirmed that both the white expression and the black expression were neutral gray with no other color.

Next, using a contrast meter (EZ Contrast 160D from Eldim), the contrast ratio of the reflection brightness of the display was measured. The data of the contrast ratio in front of the display and the field of view (view angle) to give a contrast ratio of 3 are shown in Table 2.

Though the edges of the stretched film, of which the optical properties vary most significantly, were used for the optical compensating films herein and though the displays fabricated all had a relatively large picture plane (diagonal length, 12 inches), good pictures were seen in the entire region of the large picture plane.

6. Fabrication of VA-Mode Liquid Crystal Displays:

According to the process of Example 1 in JP-A 249223/2000, a transparent support was prepared for which, however, used was any of the optical compensating films 11 to 12 of the invention. According to the process of Example 3 therein, a polarizing plate was formed; and according to the process of Example 5 therein, a VA-mode liquid crystal display was constructed. In stacking the optical compensating film and the polarizing film in this, however, the two were so controlled that the absorption axis of the polarizing film crosses the phase lag axis of the optical compensating film at an angle of 45 degrees. The devices thus fabricated herein to have the optical compensating film of the invention all had a broad field of view, concretely having a view angle of at least 160 degrees in the vertical direction and a view angle of at least 160 degrees in the horizontal direction. However, those having the optical compensating film of Comparative Example 1 or 2 were not so good, concretely having a view angle of 140 degrees in both the vertical direction and the horizontal direction.

7. Fabrication of ECB-Mode Liquid Crystal Displays:

According to the process of Example 1 in JP-A 316378/1999, circularly polarizing plates were fabricated in which, however, the optical compensating films 11 to 22 of the invention were used for the second transparent support. When the optical compensating film was stuck to the polarizing film, they were so controlled that the absorption axis of the polarizing film crosses the phase lag axis of the optical compensating film at an angle of 45 degree. Using the circularly polarizing plates thus fabricated herein, ECB-mode liquid crystal displays were constructed according to the process of Example 6 in JP-A 316378/1999. The devices comprising the optical compensating film of the invention all had a broad field of view, concretely having a view angle of at least 120 degrees in the vertical direction and a view angle of at least 115 degrees in the horizontal direction. However, the devices comprising the comparative, optical compensating film 23 were not so good, concretely having a view angle of not larger than 100 degrees in both the vertical direction and the horizontal direction.

8. Fabrication of Organic EL Device-Having Displays, and Touch Panels:

In the touch panel having the constitution of FIG. 1 in JP-A 127822/1993, used was any of the optical compensating films 11 to 23. Thus fabricated, the touch panels comprising the optical compensating film of the invention all had a broad field of view, but those comprising the comparative, optical compensating film 23 did not.

In the organic EL device in Example 1 in JP-a 305729/1999, any of the optical compensating films 21 to 22 of the invention or the comparative, optical compensating film 23 was used. Thus fabricated, the devices comprising the optical compensating film of the invention had a broad field of view, but those comprising he comparative, optical compensating film did not.

INDUSTRIAL APPLICABILITY

According to the method of the invention, optical compensating films having a large NZ factor and having good view angle characteristics (especially λ/4 plates having a phase difference of λ/4 in a broad wavelength range) can be stably produced on an industrial scale. In particular, in the method, the NZ factor of the optical compensating films produced can be well controlled, without changing the retardation thereof, and therefore the method ensures industrial-scale stable production of optical compensating films having improved view angle characteristics.

In addition, image displays, especially reflection or semi-transmission liquid crystal displays and organic electroluminescent device-having image displays that comprise the optical compensating film produced according to the method of the invention or comprise a polarizing plate having the optical compensating film all have good view angle characteristics.

The invention claimed is:

1. A method for producing an optical compensating film, which comprises stretching a cellulose acetate film, the cellulose acetate film having a water content of 2.0 to 20.0% by weight,
wherein the cellulose acetate for the film has an acetyl value of from 57.0% to 62.5%.

2. The method for producing an optical compensating film as claimed in claim 1, wherein the optical compensating film has a retardation value measured at a wavelength of 550 nm (Re550) of 20 nm to 2000 nm: $20\ nm \leq Re550 \leq 2000\ nm$.

3. The method for producing an optical compensating film as claimed in claim 1, wherein the optical compensating film has a distribution of the retardation value measured at a wavelength of 550 nm (Re550) of 10% or less in both a width direction and a longitudinal direction of the film.

4. The method for producing an optical compensating film as claimed in claim 1, wherein the optical compensating film has:
the retardation value measured at a wavelength of 450 nm (Re450) of 60 to 135 nm; and
the retardation value measured at a wavelength of 590 nm (Re590) of 100 to 170 nm,
and the stretched film satisfies the condition: $(Re590-Re450) \geq 2\ nm$.

5. The method for producing an optical compensating film as claimed in claim 1, wherein the optical compensating film satisfies the conditions: $0.5 < Re450/Re550 < 0.98$; and $1.01 < Re650/Re550 < 1.35$, in which Re450, Re550 and Re650 represent the retardation values measured at a wavelength of 450 nm, 550 nm and 650 nm, respectively.

6. The method for producing an optical compensating film as claimed in claim 1, wherein the cellulose acetate film is dipped in water and/or exposed to water vapor to absorb water, before the stretch.

7. The method for producing an optical compensating film as claimed in claim 1, wherein no water film is substantially formed on the surface of the cellulose acetate film when the cellulose acetate film is stretched.

8. The method for producing an optical compensating film as claimed in claim 1, wherein the water content of the cellulose acetate film just after having been stretched is 2.0 to 20.0% by weight.

9. The method for producing an optical compensating film as claimed in claim 1, wherein, when L indicates the distance between the fixing members for fixing the cellulose acetate film when stretching and W indicates the width of the cellulose acetate film measured in the direction perpendicular to the fixing member-to-fixing member direction, the aspect ratio: L/W satisfies the condition: $0.1 \leq L/W \leq 2$.

10. The method for producing an optical compensating film as claimed in claim 1, which comprises a step of stretching the cellulose acetate film between at least two pairs of nip rolls by a difference in the rotation speed between the at least two pairs of nip rolls.

11. The method for producing an optical compensating film as claimed in claim 10, wherein, when W' (cm) indicates the width of the cellulose acetate film and L' (cm) indicates the distance between the at least two pairs of nip rolls, the aspect ratio: L'/W' satisfies the condition: $0.5 \leq L'/W' \leq 2$.

12. The method for producing an optical compensating film as claimed in claim 1, wherein the film is stretched in water.

13. The method for producing an optical compensating film as claimed in claim 1, wherein the film is stretched in air.

14. The method for producing an optical compensating film as claimed in claim 1, wherein the film is stretched in water vapor having a relative humidity of from 60% to 100%.

15. The method for producing an optical compensating film as claimed in claim 1, wherein the film is stretched at a temperature of 50° C. to 150° C.

16. The method for producing an optical compensating film as claimed in claim 1, wherein the film is stretched with a draw ratio of from 1.1 times to 2.0 times.

17. The method for producing an optical compensating film as claimed in claim 1, wherein the stretching time is 1 second to 30 seconds.

18. The method for producing an optical compensating film as claimed in claim 1, wherein the optical compensating film satisfies the condition: $1 \leq (nx-nz)/(nx-ny) \leq 3$, in which nx indicates the refractive index along the slow axis in plain of the optical compensating film, ny indicates the refractive index perpendicular to the slow axis in plane of the optical compensating film, and nz indicates the refractive index of the film in the direction of the thickness thereof.

19. The method for producing an optical compensating film as claimed in claim 1, wherein the optical compensating film has a haze value of 0 to 2%.

20. The method for producing an optical compensating film as claimed in claim 1, wherein the cellulose acetate film contains an aromatic compound having at least two aromatic rings in an amount of from 0.01 to 20 parts by weight, based on 100 parts by weight of the film.

21. An optical compensating film produced according to the method for producing an optical compensating film as described in claim 1.

22. A polarizing plate, which is a laminate including:

the optical compensating film produced according to the method for producing an optical compensating film as described in claim 1; and at least one of a polarizing film and a polarizing plate.

23. An image display comprising at least one of:

the optical compensating film produced according to the method for producing an optical compensating film as described in claim 1; and the polarizing plate, which is a laminate including: the optical compensating film produced according to the method for producing an optical compensating film as described in claim 1; and at least one of a polarizing film and a polarizing plate.

* * * * *